US012651608B2

(12) United States Patent
Xiao et al.

(10) Patent No.: US 12,651,608 B2
(45) Date of Patent: Jun. 9, 2026

(54) VOICE ACTIVITY DETECTION METHOD AND SYSTEM, AND VOICE ENHANCEMENT METHOD AND SYSTEM

(71) Applicant: Shenzhen Shokz Co., Ltd., Shenzhen (CN)

(72) Inventors: Le Xiao, Shenzhen (CN); Chengqian Zhang, Shenzhen (CN); Fengyun Liao, Shenzhen (CN); Xin Qi, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 225 days.

(21) Appl. No.: 18/370,381

(22) Filed: Sep. 19, 2023

(65) Prior Publication Data

US 2024/0046956 A1 Feb. 8, 2024

Related U.S. Application Data

(63) Continuation of application No. PCT/CN2021/130035, filed on Nov. 11, 2021.

(51) Int. Cl.
*G10L 25/78* (2013.01)
*G10L 21/0216* (2013.01)

(52) U.S. Cl.
CPC .......... *G10L 25/78* (2013.01); *G10L 21/0216* (2013.01); *G10L 2021/02166* (2013.01)

(58) Field of Classification Search
CPC ................. G10L 25/78; G10L 21/0216; G10L 2021/02166; G10L 21/0232;
(Continued)

(56) References Cited

U.S. PATENT DOCUMENTS 6,256,336 B1 * 7/2001 Rademacher ........ H04B 1/7103 375/349
6,615,170 B1 * 9/2003 Liu ......................... G10L 25/78 704/231
(Continued)

FOREIGN PATENT DOCUMENTS

CN 102855880 A 1/2013
CN 102938254 A 2/2013
(Continued)

OTHER PUBLICATIONS

M. Viberg, P. Stoica, and B. Ottersten. Maximum Like- lihood Array Processing in Spatially Correlated Noise Fields Using Parameter-ized Signals. IEEE Trans. Sig-nal Processing, 45(4):996-1004,Apr. 1997. (Year: 1997).*
(Continued)

*Primary Examiner* — Fariba Sirjani
(74) *Attorney, Agent, or Firm* — Fideli Law PLLC; Qiang Li

(57) ABSTRACT

Microphone signals output by the microphone array satisfy a first model corresponding to a noise signal or a second model corresponding to a target voice signal mixed with a noise signal. A method and system may optimize the first model and the second model respectively by using maximization of a likelihood function and rank minimization of a noise covariance matrix as joint optimization objectives, and determine a first estimate of a noise covariance matrix of the first model and a second estimate of a noise covariance matrix of the second model; and determine, by using a statistical hypothesis testing method, whether the microphone signals satisfy the first model or the second model, so as to determine whether the target voice signal is present in the microphone signals, determine a noise covariance matrix
(Continued)

S140 of the microphone signals, and further perform voice enhancement on the microphone signals.

10 Claims, 11 Drawing Sheets

(58) Field of Classification Search
CPC . G10L 21/0264; G10L 25/84; G10L 21/0272; G10L 15/14; G10L 17/04; G10L 17/06
See application file for complete search history.

(56) References Cited

U.S. PATENT DOCUMENTS

| | | | | |
|---|---|---|---|---|
| 6,717,979 | B2 * | 4/2004 | Ribeiro Dias | G01S 3/74 375/150 |
| 7,478,043 | B1 * | 1/2009 | Preuss | G10L 19/06 704/231 |
| 8,082,286 | B1 * | 12/2011 | Picciolo | G01S 7/292 708/305 |
| 9,173,025 | B2 * | 10/2015 | Dickins | H04R 1/1083 |
| 9,549,253 | B2 * | 1/2017 | Alexandridis | H04R 3/005 |
| 9,949,040 | B2 * | 4/2018 | Bergmann | H04R 25/554 |
| 11,341,981 | B2 * | 5/2022 | Moon | H04L 1/1887 |
| 12,475,915 | B2 * | 11/2025 | Xiao | G10L 25/84 |
| 2003/0012262 | A1 * | 1/2003 | Ribeiro Dias | G01S 3/74 375/147 |
| 2003/0200097 | A1 * | 10/2003 | Brand | G10L 25/48 704/E11.002 |
| 2004/0008803 | A1 * | 1/2004 | Aldrovandi | H04L 25/0204 375/347 |
| 2004/0240587 | A1 * | 12/2004 | Ozen | H04L 25/025 375/343 |
| 2005/0227663 | A1 * | 10/2005 | He | H04L 1/20 455/296 |
| 2007/0036202 | A1 * | 2/2007 | Ge | H04B 1/71052 375/141 |
| 2009/0196386 | A1 * | 8/2009 | Ikram | H04L 25/03006 375/350 |
| 2009/0292966 | A1 * | 11/2009 | Liva | H04L 1/0057 714/752 |
| 2013/0057433 | A1 * | 3/2013 | Sadler | H04B 17/309 342/373 |
| 2013/0311137 | A1 * | 11/2013 | Schaum | G06F 17/18 702/181 |
| 2014/0056435 | A1 * | 2/2014 | Kjems | G10L 15/20 381/317 |
| 2014/0372091 | A1 * | 12/2014 | Larimore | G06F 30/20 703/2 |
| 2015/0082377 | A1 * | 3/2015 | Chari | H04L 63/20 726/1 |
| 2016/0180852 | A1 * | 6/2016 | Huang | H04M 3/568 704/246 |
| 2018/0102135 | A1 * | 4/2018 | Ebenezer | G10L 25/84 |
| 2018/0359572 | A1 * | 12/2018 | Jensen | H04R 25/407 |
| 2019/0158522 | A1 * | 5/2019 | Amirmazlaghani | G06N 5/045 |
| 2020/0219530 | A1 * | 7/2020 | Nesta | H04R 3/005 |
| 2021/0375306 | A1 * | 12/2021 | Li | G06F 17/142 |
| 2021/0390952 | A1 * | 12/2021 | Masnadi-Shirazi | G10L 15/20 |
| 2023/0077396 | A1 * | 3/2023 | Ma | G10K 11/17855 381/71.8 |
| 2023/0077621 | A1 * | 3/2023 | Ono | G10L 21/028 381/56 |
| 2023/0260529 | A1 * | 8/2023 | Xiao | G10L 21/0232 704/233 |
| 2024/0038257 | A1 * | 2/2024 | Xiao | H04R 1/406 |
| 2024/0046956 | A1 * | 2/2024 | Xiao | G10L 21/0216 |

FOREIGN PATENT DOCUMENTS

| | | | |
|---|---|---|---|
| CN | 109087664 | A | 12/2018 |
| CN | 110148420 | A | 8/2019 |
| CN | 110164452 | U | 8/2019 |
| JP | 2006154819 | A | 6/2006 |
| JP | 2015135437 | A | 7/2015 |
| JP | 2018036332 | A | 3/2018 |
| JP | 2019508719 | A | 3/2019 |
| KR | 1020190073852 | A | 6/2019 |
| KR | 1020190091061 | A | 8/2019 |
| KR | 1020200078584 | A | 7/2020 |
| WO | 2006114100 | A1 | 11/2006 |

OTHER PUBLICATIONS

Philippe Forster, Thierry Aste. Maximum likelihood multichannel estimation under reduced rank constraint. In Proceedings of the 1998 IEEE International Conference on Acoustics, Speech and Signal Processing, ICASSP '98, Seattle, Washington, USA, May 12- 15, 1998. pp. 3317-3320, IEEE, 1998. [doi] (Year: 1998).*

International Search Report of PCT/CN2021/130035 (May 27, 2022).

Zhou Hong et al. "Application of Differential Evolution Optimization Based Gaussian Mixture Models to Speaker Recognition" The 26th Chinese Control and Decision Conference (2014 CCDC), Jul. 14, 2014 (Jul. 14, 2014).

Hoang Poul et al: "Joint Maximum Likelihood Estimation of Power Spectral Densities and Relative Acoustic Transfer Functions for Acoustic Beamforming", ICASSP 2021-2021 IEEE International Conference on Acoustics, Speech and Signal Processing (ICASSP), IEEE, Jun. 6, 2021 (Jun. 6, 2021), pp. 6119-6123, XP033955515.

Mehdi Zohourian et al: "Binaural Speaker Localization Integrated Into an Adaptive Beamformer for Hearing Aids", ARXIV:1806.04885V2,, vol. 26, No. 3, Mar. 1, 2018 (Mar. 1, 2018), pp. 515-528, XP058381893, DOI: 10.1109/TASLP.2017.2782491 * sections V, VI*.

Martin-Donas Juan Manuel et al: "Online Multichannel Speech Enhancement Based on Recursive EM andDNN-Based Speech Presence Estimation", ARXIV:1806.04885V2,, vol. 28, Nov. 7, 2020 (Nov. 7, 2020), pp. 3080-3094, XP011823409, DOI: 10.1109/TASLP.2020.3036776 [retrieved on Dec. 2, 2020] * equations 1-7 and their context* * sections IV.C, V.C *.

Liao, F, "Research of Measurement of Radiated Noise of Submarines and Passive Ranging" Harbin Engineering University, Apr. 15, 2007.

Zhu, W, "Determining the No. of Sources and Angle Estimation Based on Uniform Circular Acoustic Vector Sensor Array" Harbin Engineering University, Mar. 31, 2018.

Xu, Y, "Joint Training of Complex Ratio Mask Based Beamformer and Acoustic Model for Noise Robust ASR" 2019 IEEE International Conference on Acoustics, Speech and Signal Processing (ICASSP), Dec. 31, 2019.

* cited by examiner

VOICE ACTIVITY DETECTION METHOD AND SYSTEM, AND VOICE ENHANCEMENT METHOD AND SYSTEM

RELATED APPLICATIONS

This application is a continuation application of PCT application No. PCT/CN2021/130035, filed on Nov. 11, 2021, and the content of which is incorporated herein by reference in its entirety.

TECHNICAL FIELD

This disclosure relates to the field of target voice signal processing technologies, and in particular, to a voice activity detection method and system, and a voice enhancement method and system.

BACKGROUND

In a voice enhancement technology based on a beamforming algorithm, and especially in a minimum variance distortionless response (MVDR) adaptive beamforming algorithm, it is very important to solve a noise covariance matrix—a parameter describing a noise statistical feature relationship between different microphones. A main method in the existing technologies is calculating a noise covariance matrix based on a voice presence probability method, for example, estimating a voice presence probability by using a voice activity detection (VAD) method, and then calculating the noise covariance matrix. However, the accuracy of estimating the voice presence probability in existing technologies is not high enough, resulting in low accuracy in estimating the noise covariance matrix, and further causing a poor voice enhancement effect of the MVDR algorithm. Especially when a quantity of microphones is small, for example, less than 5, the effect deteriorates sharply. Therefore, the MVDR algorithm in the existing technologies is mainly used in a microphone array device having a large quantity of microphones with large spaces therebetween, such as a mobile phone and a smart speaker, but the voice enhancement effect is poor for a device having a small quantity of microphones with small spaces therebetween, such as a head phone.

Therefore, a voice activity detection method and system, and a voice enhancement method and system having higher accuracy need to be provided.

SUMMARY

This disclosure provides a voice activity detection method and system, and a voice enhancement method and system having higher accuracy.

According to a first aspect, this disclosure provides a voice activity detection system, including at least one storage medium storing a set of instructions for voice activity detection; and at least one processor in communication with the at least one storage medium, where during a process of voice activity detection for M microphones distributed in a preset array shape, where M is an integer greater than 1, the at least one processor executes the set of instructions to: obtain microphone signals output by the M microphones, where the microphone signals satisfy a first model corresponding to absence of a target voice signal or a second model corresponding to presence of a target voice signal, optimize the first model and the second model respectively by using maximization of a likelihood function and rank minimization of a noise covariance matrix as joint optimization objectives, and determine a first estimate of a noise covariance matrix of the first model and a second estimate of a noise covariance matrix of the second model, and determine, based on statistical hypothesis testing, a target model and a noise covariance matrix corresponding to the microphone signals, where the target model includes one of the first model and the second model, and the noise covariance matrix of the microphone signals is a noise covariance matrix of the target model.

According to a second aspect, this disclosure further provides a voice activity detection method, where the method is for M microphones distributed in a preset array shape, and M is an integer greater than 1, the voice activity detection method includes: obtaining microphone signals output by the M microphones, where the microphone signals satisfy a first model corresponding to absence of a target voice signal or a second model corresponding to presence of a target voice signal; optimizing the first model and the second model respectively by using maximization of a likelihood function and rank minimization of a noise covariance matrix as joint optimization objectives, and determining a first estimate of a noise covariance matrix of the first model and a second estimate of a noise covariance matrix of the second model; and determining, based on statistical hypothesis testing, a target model and a noise covariance matrix corresponding to the microphone signals, where the target model includes one of the first model and the second model, and the noise covariance matrix of the microphone signals is a noise covariance matrix of the target model.

According to a third aspect, this disclosure further provides a voice enhancement system, including at least one storage medium storing a set of instructions for voice enhancement; and at least one processor in communication with the at least one storage medium, where during a process of voice enhancement for M microphones distributed in a preset array shape, where M is an integer greater than 1, the at least one processor executes the set of instructions to: obtain microphone signals output by the M microphones, determine target models of the microphone signals and noise covariance matrices of the microphone signals, where the noise covariance matrices of the microphone signals are noise covariance matrices of the target models, determine, based on an MVDR method and the noise covariance matrices of the microphone signals, filter coefficients corresponding to the microphone signals, and combine the microphone signals based on the filter coefficients, and output a target audio signal.

According to a fourth aspect, this disclosure further provides a voice enhancement method, where the voice enhancement method is for M microphones distributed in a preset array shape, and M is an integer greater than 1, the voice enhancement method includes: obtaining microphone signals output by the M microphones; determining target models of the microphone signals and noise covariance matrices of the microphone signals, where the noise covariance matrices of the microphone signals are noise covariance matrices of the target models; determining, based on an MVDR method and the noise covariance matrices of the microphone signals, filter coefficients corresponding to the microphone signals; and combining the microphone signals based on the filter coefficients, and outputting a target audio signal.

As can be known from the foregoing technical solutions, the voice activity detection method and system, and the voice enhancement method and system provided in this disclosure may be applied to a microphone array including a plurality of microphones. The microphone signals output by the microphone array satisfy a first model corresponding to a noise signal or a second model corresponding to a target voice signal mixed with a noise signal. To determine whether a target voice signal is present in the microphone signals, the method and system may optimize the first model and the second model respectively by using maximization of a likelihood function and rank minimization of a noise covariance matrix as joint optimization objectives, and determine a first estimate of a noise covariance matrix of the first model and a second estimate of a noise covariance matrix of the second model; and determine, by using a statistical hypothesis testing method, whether the microphone signals satisfy the first model or the second model, so as to determine whether the target voice signal is present in the microphone signals, determine a noise covariance matrix of the microphone signals, and further perform voice enhancement on the microphone signals based on an MVDR method. The method and system may improve accuracy of noise covariance estimation, and further improve a voice enhancement effect.

Other functions of the voice activity detection method and system, and the voice enhancement method and system provided in this disclosure are partially listed in the following description. Based on the description, content described in the following figures and examples would be obvious to a person of ordinary skill in the art. The inventive aspects of the voice activity detection method and system, and the voice enhancement method and system provided in this disclosure may be fully explained by practicing or using the method, apparatus, and a combination thereof in the following detailed examples.

BRIEF DESCRIPTION OF DRAWINGS

To describe the technical solutions in the embodiments of this disclosure more clearly, the following briefly describes the accompanying drawings required for describing the embodiments. Apparently, the accompanying drawings in the following description show merely some exemplary embodiments of this disclosure, and a person of ordinary skill in the art may still derive other drawings from these drawings without creative efforts.

DETAILED DESCRIPTION

Figure 1:
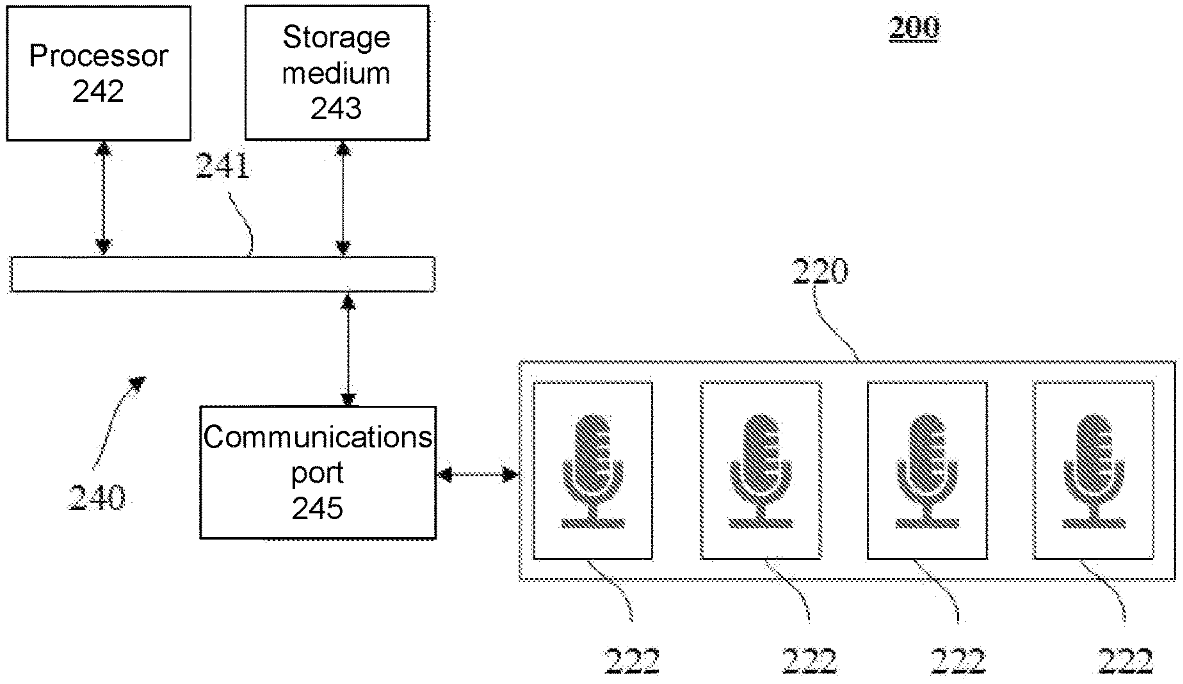
FIG. 1 is a schematic hardware diagram of a voice activity detection system according to some exemplary embodiments of this disclosure.

The following description provides specific application scenarios and requirements of this disclosure, to enable a person skilled in the art to make and use content of this disclosure. Various partial modifications to the disclosed exemplary embodiments are obvious to a person skilled in the art. General principles defined herein may be applied to other embodiments and applications without departing from the spirit and scope of this disclosure. Therefore, this disclosure is not limited to the illustrated embodiments, but is to be accorded the widest scope consistent with the claims.

The terms used herein are only intended to describe specific exemplary embodiments and are not restrictive. For example, as used herein, singular forms "a", "an", and "the" may also include plural forms, unless otherwise explicitly specified in a context. When used in this disclosure, the terms "comprising", "including", and/or "containing" indicate presence of associated integers, steps, operations, elements, and/or components, but do not preclude presence of one or more other features, integers, steps, operations, elements, components, and/or groups or addition of other features, integers, steps, operations, elements, components, and/or groups to the system/method.

In view of the following description, these features and other features of this disclosure, operations and functions of related elements of structures, and economic efficiency in combining and manufacturing components may be significantly improved. All of these form a part of this disclosure with reference to the drawings. However, it should be understood that the drawings are only for illustration and description purposes and are not intended to limit the scope of this disclosure. It should also be understood that the drawings are not drawn to scale.

Flowcharts used in this disclosure show operations implemented by the system according to some exemplary embodiments of this disclosure. It should be understood that operations in the flowcharts may be implemented out of the order described herein. The operations may be implemented in a reverse order or simultaneously. In addition, one or more other operations may be added to the flowcharts, and one or more operations may be removed from the flowcharts.

For ease of description, the following first explains terms that will appear in this disclosure.

Statistical hypothesis testing: It is a method for inferring a population from samples based on an assumption in mathematical statistics. A specific method is: making a hypothesis on the population under study based on a requirement of a problem, and marking the hypothesis as an original hypothesis $H_0$; selecting a suitable statistic, where the selection of the statistic should make a distribution thereof known when the original hypothesis $H_0$ is true; and based on the measured samples, calculating a statistic value, performing a test based on a pre-given significance level, and making a decision on rejecting or accepting the original hypothesis $H_0$. Common statistical hypothesis testing methods include u-testing, t-testing, $X^2$ testing (chi-square testing), F-testing, rank sum testing, and the like.

Minimum variance distortionless response (MVDR): It is an adaptive beamforming algorithm based on a maximum signal to interference plus noise ratio (SI NR) criterion. The MVDR algorithm may adaptively minimize power of an array output in a desired direction while maximizing the signal to interference plus noise ratio. Its objective is to minimize a variance of a recorded signal. If a noise signal is uncorrelated with a desired signal, the variance of the recorded signal is a sum of variances of the desired signal and the noise signal. Therefore, the MVDR solution seeks to minimize this sum, thereby mitigating impact of the noise signal. Its principle is to choose an appropriate filter coefficient to minimize average power of the array output under a constraint that the desired signal is distortionless.

Voice activity detection: It is a process of segmenting a target voice signal into a voice period and a non-voice period.

Gaussian distribution: A normal distribution is also known as Gaussian distribution. A normal curve is bell-shaped, low at both ends, high in the middle, and left-right symmetric. Because the curve of the Gaussian distribution is bell-shaped, the curve is also often referred to as a bell-shaped curve. If a random variable X conforms to a with a mathematical expectation $\mu$ and a variance $\sigma^2$, the normal distribution is denoted as $N(\mu, \sigma^2)$. A probability density function of the random variable is an expected value $\mu$ of the normal distribution, which determines a position of the random variable. A standard deviation a of the random variable determines an amplitude of the distribution. When $\mu=0$ and $\sigma=1$, the normal distribution is a standard normal distribution.

FIG. 1 is a schematic hardware diagram of a voice activity detection system according to some exemplary embodiments of this disclosure. The voice activity detection system may be applied to an electronic device 200.

In some exemplary embodiments, the electronic device 200 may be a wireless head phone, a wired head phone, or an intelligent wearable device, for example, a device having an audio processing function such as smart glasses, a smart helmet, or a smart watch. The electronic device 200 may also be a mobile device, a tablet computer, a notebook computer, a built-in apparatus of a motor vehicle, or the like, or any combination thereof. In some exemplary embodiments, the mobile device may include a smart household device, a smart mobile device, or the like, or any combination thereof. For example, the smart mobile device may include a mobile phone, a personal digital assistant, a game device, a navigation device, an ultra-mobile personal computer (UMPC), or the like, or any combination thereof. In some exemplary embodiments, the smart household device may include a smart television, a desktop computer, or the like, or any combination thereof. In some exemplary embodiments, the built-in apparatus of the motor vehicle may include a vehicle-mounted computer, a vehicle-mounted television, or the like.

In this disclosure, an example in which the electronic device 200 is a head phone is used for description. The head phone may be a wireless head phone, or may be a wired head phone. As shown in FIG. 1, the electronic device 200 may include a microphone array 220 and a computing apparatus 240.

The microphone array 222 may be an audio capture device of the electronic device 200. The microphone array 222 may be configured to obtain a local audio, and output microphone signals, that is, an electronic signal carrying audio information. The microphone array 222 may include M microphones 222 distributed in a preset array shape. M is an integer greater than 1. The M microphones 222 may be distributed evenly or unevenly. The M microphones 222 may output microphone signals. The M microphones 222 may output M microphone signals. Each microphone 222 corresponds to one microphone signal. The M microphone signals are collectively referred to as the microphone signals. In some exemplary embodiments, the M microphones 222 may be distributed linearly. In some exemplary embodiments, the M microphones 222 may be distributed in an array of another shape, such as a circular array or a rectangular array. For ease of description, the linear distribution of the M microphones 222 is used as an example for description in the following description. In some exemplary embodiments, M may be any integer greater than 1, such as 2, 3, 4, 5, or even greater. In some exemplary embodiments, due to a space limitation, M may be an integer greater than 1 and not greater than 5, for example, in a product such as a head phone. When the electronic device 200 is a head phone, a spacing between adjacent microphones 222 of the M microphones 222 may be 20 mm to 40 mm. In some exemplary embodiments, the spacing between adjacent microphones 222 may be smaller, for example, 10 mm to 20 mm.

In some exemplary embodiments, the microphone 222 may be a bone conduction microphone that directly captures human body vibration signals. The bone conduction microphone may include a vibration sensor, for example, an optical vibration sensor or an acceleration sensor. The vibration sensor may capture a mechanical vibration signal (for example, a signal generated by a vibration generated by a skin or a bone when a user speaks), and convert the mechanical vibration signal into an electrical signal. Herein, the mechanical vibration signal mainly refers to a vibration propagated by a solid. The bone conduction microphone captures, by touching the skin or bone of the user with the vibration sensor or a vibration component connected to the vibration sensor, a vibration signal generated by the bone or skin when the user generates sound, and converts the vibration signal into an electrical signal. In some exemplary embodiments, the vibration sensor may be an apparatus that is sensitive to a mechanical vibration but insensitive to an air vibration (that is, a capability of responding to the mechanical vibration by the vibration sensor exceeds a capability of responding to the air vibration by the vibration sensor). Since the bone conduction microphone may directly pick a vibration signal of a sound generation part, the bone conduction microphone may reduce impact of ambient noise.

In some exemplary embodiments, the microphone 222 may alternatively be an air conduction microphone that directly captures air vibration signals. The air conduction microphone captures an air vibration signal caused when the user generates sound, and converts the air vibration signal into an electrical signal.

In some exemplary embodiments, the M microphones 222 may be M bone conduction microphones. In some exemplary embodiments, the M microphones 2202 may alternatively be M air conduction microphones. In some exemplary embodiments, the M microphones 222 may include both bone conduction microphone(s) and air conduction microphone(s). Certainly, the microphone 222 may alternatively be another type of microphone, for example, an optical microphone, a microphone receiving a myoelectric signal.

The computing apparatus 240 may be in communication with the microphone array 220. The communication herein may be a communication in any form and capable of directly or indirectly receiving information. In some exemplary embodiments, the computing apparatus 240 and the microphone array 220 may transfer data to each other over a wireless communication connection. In some exemplary embodiments, the computing apparatus 240 and the microphone array 220 may alternatively transfer data to each other over a direct connection by using a wire. In some exemplary embodiments, the computing apparatus 240 may alternatively be connected directly to another circuit by using a wire and hence connected indirectly to the microphone array 220 to implement mutual data transfer. The direct connection between the computing apparatus 240 and the microphone array 220 by using a wire is used as an example for description in this disclosure.

The computing apparatus 240 may be a hardware device having a data information processing function. In some exemplary embodiments, the voice activity detection system may include the computing apparatus 240. In some exemplary embodiments, the voice activity detection system may be applied to the computing apparatus 240. In other words, the voice activity detection system may operate on the computing apparatus 240. The voice activity detection system may include a hardware device having a data information processing function and a program required to drive the hardware device to work. Certainly, the voice activity detection system may also be only a hardware device having a data processing capability or only a program executed by a hardware device.

The voice activity detection system may store data or an instruction(s) for performing a voice activity detection method described in this disclosure, and may execute the data and/or the instruction. When the voice activity detection system operates on the computing apparatus 240, the voice activity detection system may obtain the microphone signals from the microphone array 220 based on the communication, and execute the data or the instruction of the voice activity detection method described in this disclosure, so as to determine whether a target voice signal is present in the microphone signals. The voice activity detection method is described in other parts of this disclosure. For example, the voice activity detection method is described in the descriptions of FIG. 3 to FIG. 8.

As shown in FIG. 1, the computing apparatus 240 may include at least one storage medium 243 and at least one processor 242. In some exemplary embodiments, the electronic device 200 may further include a communications port 245 and an internal communications bus 241.

The internal communications bus 241 may connect different system components, including the storage medium 243, the processor 242, and the communications port 245.

The communications port 245 may be used for data communication between the computing apparatus 240 and the outside world. For example, the computing apparatus 240 may obtain the microphone signals from the microphone array 220 through the communications port 245.

The at least one storage medium 243 may include a data storage apparatus. The data storage apparatus may be a non-transitory storage medium, or may be a transitory storage medium. For example, the data storage apparatus may include one or more of a magnetic disk, a read-only memory (ROM), or a random access memory (RAM). When the voice activity detection system operates on the computing apparatus 240, the storage medium 243 may further include at least one instruction set stored in the data storage apparatus, where the instruction set is used to perform voice activity detection on the microphone signals. The instruction is computer program code. The computer program code may include a program, a routine, an object, a component, a data structure, a process, a module, or the like for performing the voice activity detection method provided in this disclosure.

The at least one processor 242 may be in communication with the at least one storage medium 243 via the internal communications bus 241. The communication connection may be a communication in any form and capable of directly or indirectly receiving information. The at least one processor 242 is configured to execute the at least one instruction set. When the voice activity detection system may run on the computing apparatus 240, the at least one processor 242 reads the at least one instruction set, and implements, based on the at least one instruction set, the voice activity detection method provided in this disclosure. The processor 242 may perform all steps included in the voice activity detection method. The processor 242 may be in a form of one or more processors. In some exemplary embodiments, the processor 242 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor that may implement one or more functions, and the like, or any combination thereof. For illustration only, one processor 242 in the computing apparatus 240 is described in this disclosure. However, it should be noted that the computing apparatus 240 in this disclosure may further include a plurality of processors 242. Therefore, operations and/or method steps disclosed in this disclosure may be performed by one processor in this disclosure, or may be performed jointly by a plurality of processors. For example, if the processor 242 of the computing apparatus 240 in this disclosure performs step A and step B, it should be understood that step A and step B may also be performed jointly or separately by two different processors 242 (for example, the first processor performs step A, and the second processor performs step B, or the first processor and the second processor jointly perform step A and step B).

Figure 2A:
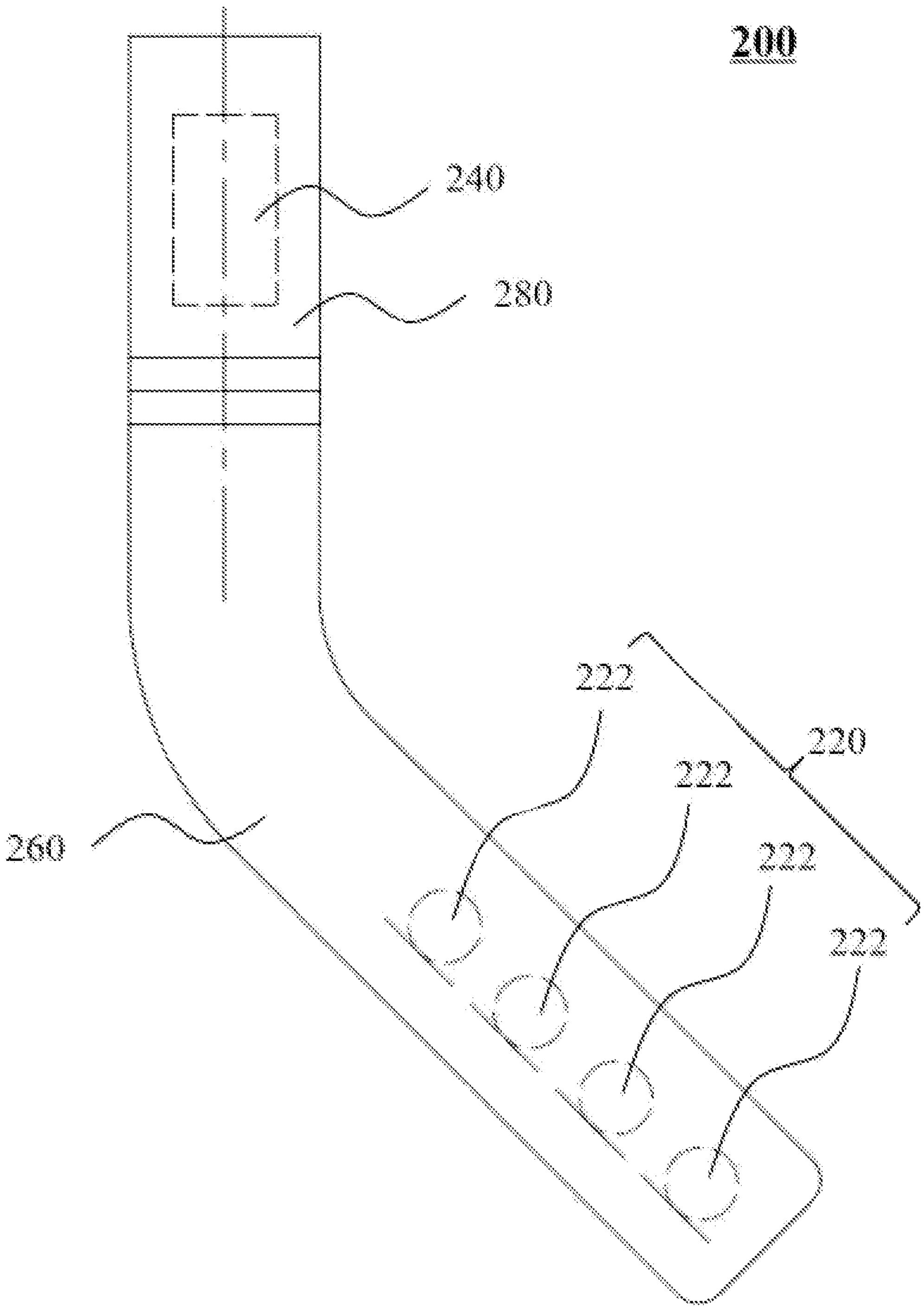
FIG. 2A is a schematic exploded structural diagram of an electronic device according to some exemplary embodiments of this disclosure.

FIG. 2A is a schematic exploded structural diagram of an electronic device 200 according to some exemplary embodiments of this disclosure. As shown in FIG. 2A, the electronic device 200 may include a microphone array 220, a computing apparatus 240, a first housing 260, and a second housing 280.

The first housing 260 may be a mounting base of the microphone array 220. The microphone array 220 may be mounted inside the first housing 260. A shape of the first housing 260 may be adaptively designed based on a distribution shape of the microphone array 220. This is not limited in this disclosure. The second housing 280 may be a mounting base of the computing apparatus 240. The computing apparatus 240 may be mounted in the second housing 280. A shape of the second housing 280 may be adaptively designed based on a shape of the computing apparatus 240. This is not limited in this disclosure. When the electronic device 200 is a head phone, the second housing 280 may be connected to a wearing part. The second housing 280 may be connected to the first housing 260. As described above, the microphone array 220 may be electrically connected to the computing apparatus 240. Specifically, the microphone array 220 may be electrically connected to the computing apparatus 240 through the connection of the first housing 260 and the second housing 280.

In some exemplary embodiments, the first housing 260 may be fixedly connected, for example, integrated, welded, riveted, or bonded, to the second housing 280. In some exemplary embodiments, the first housing 260 may be detachably connected to the second housing 280. The computing apparatus 240 may be in communication with different microphone arrays 220. Specifically, a difference between the different microphone arrays 220 may lie in different quantities of microphones 222 in the microphone arrays 220, different array shapes, different spacings between the microphones 222, different mounting angles of the microphone arrays 220 in the first housing 260, different mounting positions of the microphone arrays 220 in the first housing 260, or the like. Depending on different application scenarios, the user may change corresponding microphone arrays 220, so that the electronic device 200 may be applied to a wider range of scenarios. For example, when the user is closer to the electronic device 200 in an application scenario, the user may replace the microphone array 220 with a microphone array 220 having a smaller microphone spacing. In another example, when the user is closer to the electronic device 200 in an application scenario, the user may replace the microphone array 220 with a microphone array 220 having a larger microphone spacing and a larger microphone quantity.

The detachable connection may be a physical connection in any form, such as a threaded connection, a snap connection, or a magnetic connection. In some exemplary embodiments, there may be a magnetic connection between the first housing 260 and the second housing 280. To be specific, the first housing 260 and the second housing 280 are detachably connected to each other by a magnetic apparatus.

Figure 2B:
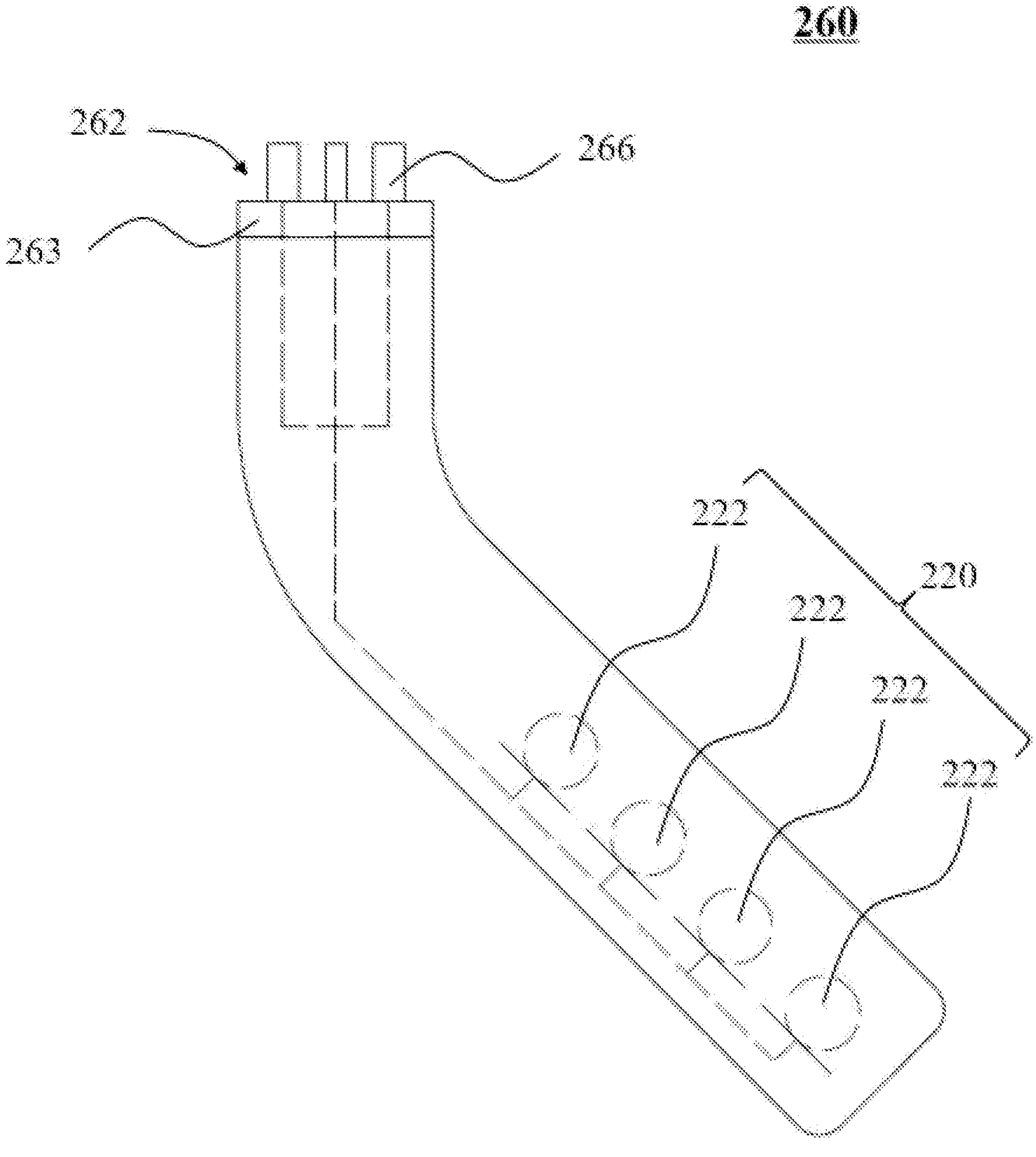
FIG. 2B is a front view of a first housing according to some exemplary embodiments of this disclosure.
Figure 2C:
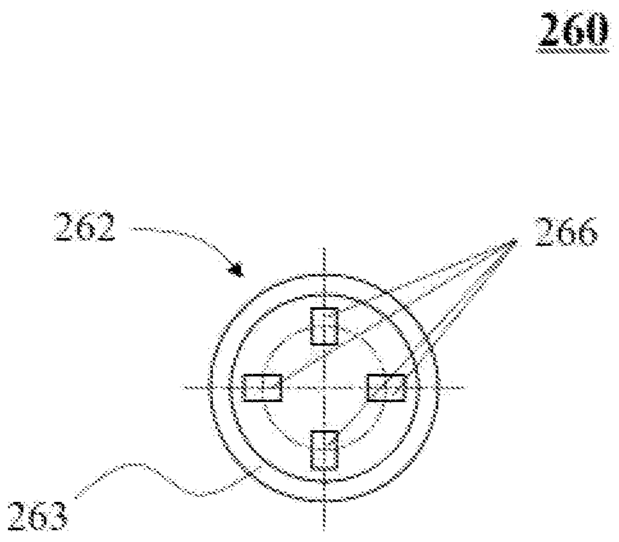
FIG. 2C is a top view of a first housing according to some exemplary embodiments of this disclosure.

FIG. 2B is a front view of the first housing 260 according to some exemplary embodiments of this disclosure. FIG. 2C is a top view of the first housing 260 according to some exemplary embodiments of this disclosure. As shown in FIG. 2B and FIG. 2C, the first housing 260 may include a first interface 262. In some exemplary embodiments, the first housing 260 may further include contacts 266. In some exemplary embodiments, the first housing 260 may further include an angle sensor (not shown in FIG. 2B and FIG. 2C).

The first interface 262 may be a mounting interface of the first housing 260 and the second housing 280. In some exemplary embodiments, the first interface 262 may be circular. The first interface 262 may be rotatably connected to the second housing 280. When the first housing 260 is mounted on the second housing 280, the first housing 260 may be rotated relative to the second housing 280 to adjust an angle of the first housing 260 relative to the second housing 280, thereby adjusting an angle of the microphone array 220.

A first magnetic apparatus 263 may be disposed on the first interface 262. The first magnetic apparatus 263 may be disposed at a position of the first interface 262 close to the second housing 280. The first magnetic apparatus 263 may generate magnetic adherence to achieve a detachable connection to the second housing 280. When the first housing 260 approaches the second housing 280, the first housing 260 may be quickly connected to the second housing 280 by the adherence. In some exemplary embodiments, after the first housing 260 is connected to the second housing 280, the first housing 260 may also be rotated relative to the second housing 280 to adjust the angle of the microphone array 220. Due to the adherence, the connection between the first housing 260 and the second housing 280 may still be maintained while the first housing 260 is rotated relative to the second housing 280.

In some exemplary embodiments, a first positioning apparatus (not shown in FIG. 2B and FIG. 2C) may also be disposed on the first interface 262. The first positioning apparatus may be an externally protruding positioning step or an internally extending positioning hole. The first positioning apparatus may cooperate with the second housing 280 to implement quick mounting of the first housing 260 and the second housing 280.

As shown in FIG. 2B and FIG. 2C, in some exemplary embodiments, the first housing 260 may further include contacts 266. The contacts 266 may be mounted on the first interface 262. The contacts 266 may protrude externally from the first interface 262. The contacts 266 may be elastically connected to the first interface 262. The contacts 266 may be in communication with the M microphones 222 in the microphone array 220. The contacts 266 may be made of an elastic metal to implement data transmission. When the first housing 260 is connected to the second housing 280, the microphone array 220 may be in communication with the computing apparatus 240 through the contacts 266. In some exemplary embodiments, the contacts 266 may be distributed in a circular shape. When the first housing 260 is rotated relative to the second housing 280 after the first housing 260 is connected to the second housing 280, the contacts 266 may also rotate relative to the second housing 280 and maintain a communication connection to the computing apparatus 240.

In some exemplary embodiments, an angle sensor (not shown in FIG. 2B and FIG. 2C) may be further disposed on the first housing 260. The angle sensor may be in communication with the contacts 266, thereby implementing a communication connection to the computing apparatus 240. The angle sensor may collect angle data of the first housing 260 to determine an angle at which the microphone array 220 is located, to provide reference data for subsequent calculation of a voice presence probability.

Figure 2D:
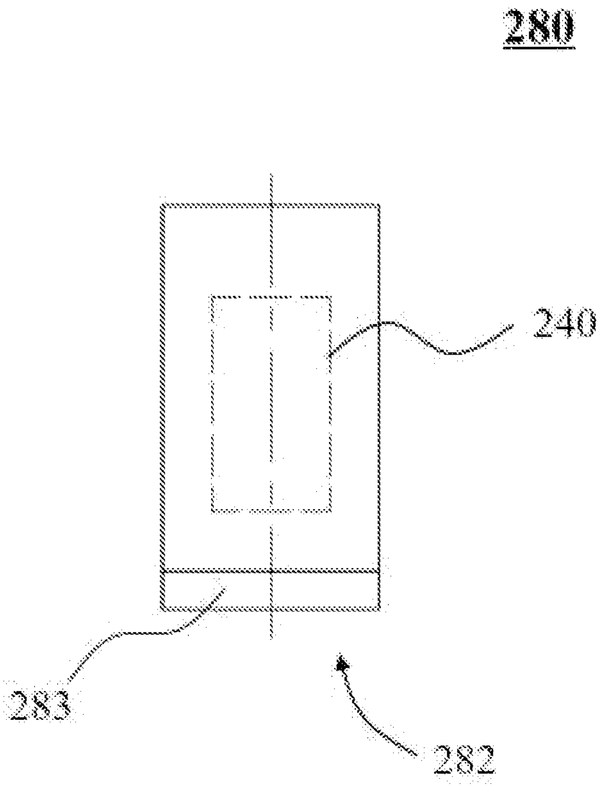
FIG. 2D is a front view of a second housing according to some exemplary embodiments of this disclosure.
Figure 2E:
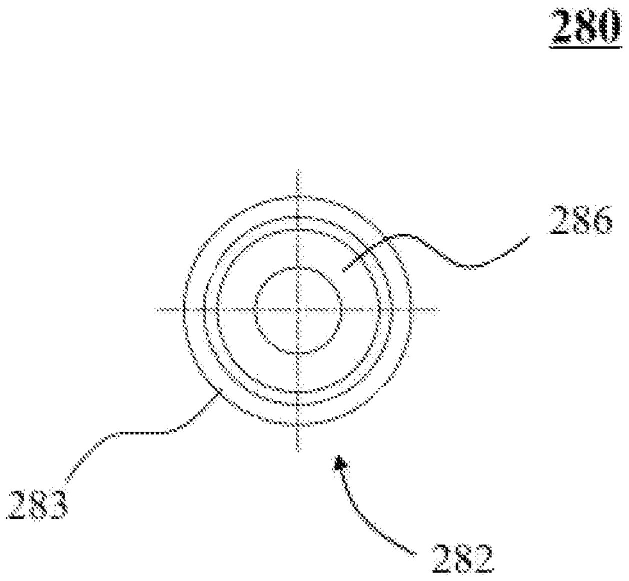
FIG. 2E is a bottom view of a second housing according to some exemplary embodiments of this disclosure.

FIG. 2D is a front view of the second housing 280 according to some exemplary embodiments of this disclosure. FIG. 2E is a bottom view of the second housing 280 according to some exemplary embodiments of this disclosure. As shown in FIG. 2D and FIG. 2E, the second housing 280 may include a second interface 282. In some exemplary embodiments, the second housing 280 may further include a guide rail 286.

The second interface 282 may be a mounting interface of the second housing 280 and the first housing 260. In some exemplary embodiments, the second interface 282 may be circular. The second interface 282 may be rotatably connected to the first interface 262 of the first housing 260. When the first housing 260 is mounted on the second housing 280, the first housing 260 may be rotated relative to the second housing 280 to adjust the angle of the first housing 260 relative to the second housing 280, thereby adjusting the angle of the microphone array 220.

A second magnetic apparatus 283 may be disposed on the second interface 282. The second magnetic apparatus 283 may be disposed at a position of the second interface 282 close to the first housing 260. The second magnetic apparatus 283 may generate magnetic adherence to achieve a detachable connection to the first interface 262. The second magnetic apparatus 283 may be used in cooperation with the first magnetic apparatus 263. When the first housing 260 approaches the second housing 280, the first housing 260 may be quickly mounted on the second housing 280 by the adherence between the second magnetic apparatus 283 and the first magnetic apparatus 263. When the first housing 260 is mounted on the second housing 280, a position of the second magnetic apparatus 283 is opposite to a position of the first magnetic apparatus 263. In some exemplary embodiments, after the first housing 260 is connected to the second housing 280, the first housing 260 may also be rotated relative to the second housing 280 to adjust the angle of the microphone array 220. Under the adherence, the connection between the first housing 260 and the second housing 280 may still be maintained while the first housing 260 is rotated relative to the second housing 280.

In some exemplary embodiments, a second positioning apparatus (not shown in FIG. 2D and FIG. 2E) may also be disposed on the second interface 282. The second positioning apparatus may be an externally protruding positioning step or an internally extending positioning hole. The second positioning apparatus may cooperate with the first positioning apparatus of the first housing 260 to implement quick mounting of the first housing 260 and the second housing 280. When the first positioning apparatus is the positioning step, the second positioning apparatus may be the positioning hole. When the first positioning apparatus is the positioning hole, the second positioning apparatus may be the positioning step.

Figure 3:
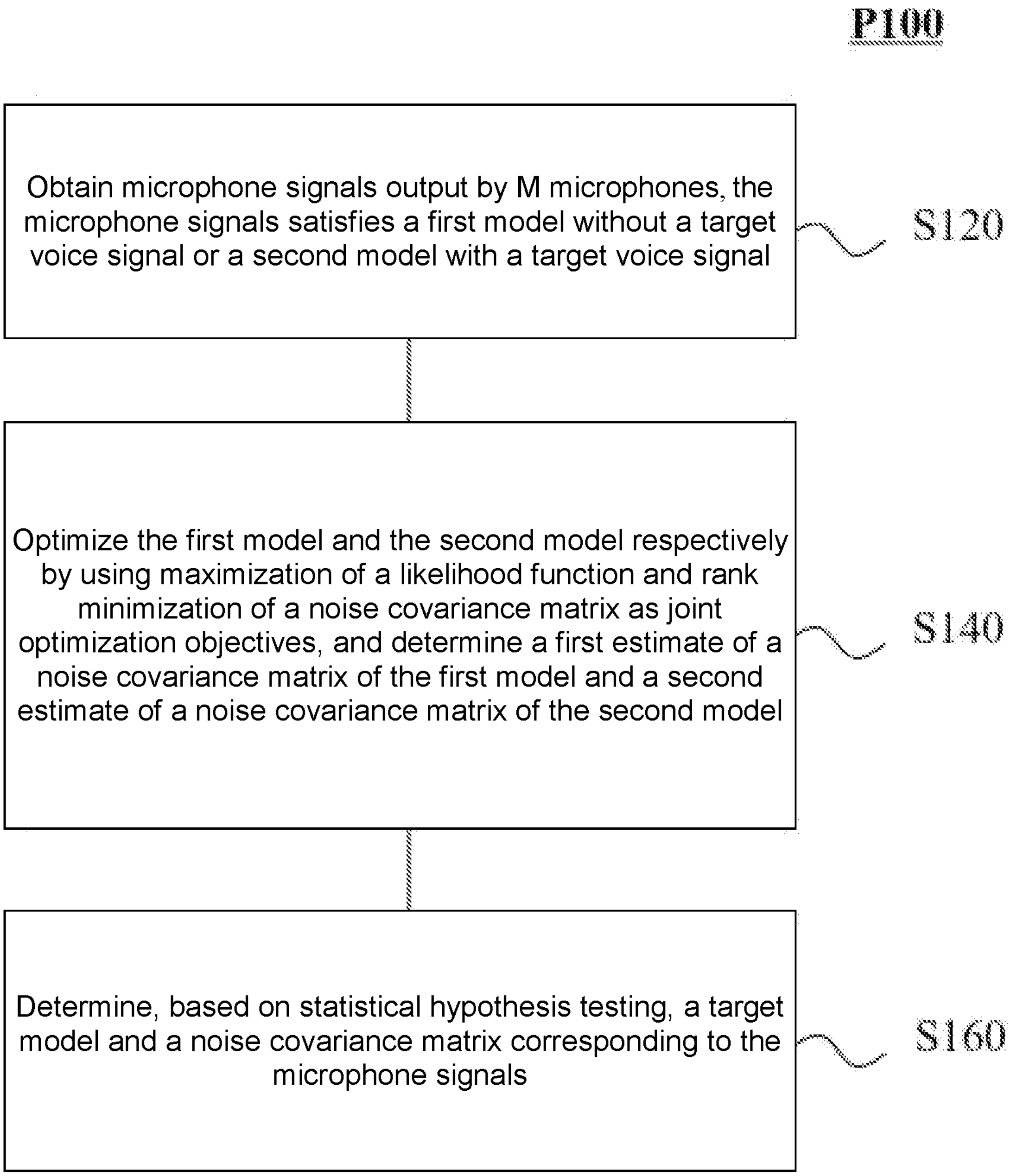
FIG. 3 is a flowchart of a voice activity detection method according to some exemplary embodiments of this disclosure.

As shown in FIG. 2D and FIG. 2E, in some exemplary embodiments, the second housing 280 may further include a guide rail 286. The guide rail 286 may be mounted on the second interface 282. The guide rail 286 may be in communication with the computing apparatus 240. The guide rail 286 may be made of a metal material to implement data transmission. When the first housing 260 is connected to the second housing 280, the contacts 266 may contact the guide rail 286 to form a communication connection, to implement the communication between the microphone array 220 and the computing apparatus 240 and implement data transmission. As described above, the contacts 266 may be elastically connected to the first interface 262. Therefore, after the first housing 260 is connected to the second housing 280, the contacts 266 may contact the guide rail 286 under elastic force of the elastic connection, so that a reliable communication may be implemented. In some exemplary embodiments, the guide rail 286 may be distributed in a circular shape. When the first housing 260 is rotated relative to the second housing 280 after the first housing 260 is connected to the second housing 280, the contacts 266 may also rotate relative to the guide rail 286 and maintain a communication connection to the guide rail 286. FIG. 3 is a flowchart of a voice activity detection method P100 according to some exemplary embodiments of this disclosure. The method P100 may determine whether a target voice signal is present in microphone signals. Specifically, a processor 242 may perform the method P100. As shown in FIG. 3, the method P100 may include the following steps.

S120. Obtain microphone signals output by M microphones 222.

As described above, each microphone 222 may output a corresponding microphone signals. The M microphones 222 correspond to M microphone signals. When determining whether a target voice signal is present in the microphone signals, the method P100 may include calculation based on all of the M microphone signals or calculation based on a part of the microphone signals. Therefore, the microphone signals may include the M microphone signals corresponding to the M microphones 222 or a part of microphone signals. In the subsequent description of this disclosure, an example in which the microphone signals may include the M microphone signals corresponding to the M microphones 222 is used for description.

In some exemplary embodiments, the microphone signal may be a time domain signal. In some exemplary embodiments, in step S120, a computing apparatus 240 may perform frame division and windowing processing on the microphone signal to divide the microphone signal into a plurality of continuous audio signals. In some exemplary embodiments, in step S120, the computing apparatus 240 may further perform a time-frequency transform on the microphone signal to obtain a frequency domain signal of the microphone signal. For ease of description, a microphone signal at any frequency is marked as X. In some exemplary embodiments, the microphone signal X may include K frames of continuous audio signals. K is any positive integer greater than 1. For ease of description, a kth frame of microphone signal is marked as $x_k$. The kth frame of microphone signal $x_k$ may be represented by the following formula:

$$x_k = [x_{1,k}, x_{2,k}, \ldots, x_{M,k}]^T \qquad \text{formula (1)}$$

The kth frame of microphone signal $x_k$ may be an M-dimensional signal vector formed by M microphone signals. The microphone signal X may be represented by an M×K data matrix. The microphone signal X may be represented by the following formula:

$$X = [x_1, x_2, \ldots, x_K] = \begin{bmatrix} x_{1,1} & \cdots & x_{1,K} \\ \vdots & \ddots & \vdots \\ x_{M,1} & \cdots & x_{M,K} \end{bmatrix} \qquad \text{formula (2)}$$

where the microphone signal X is an M×K data matrix; an mth row in the data matrix represents a microphone signal received by an mth microphone; and a kth column represents the kth frame of microphone signal.

As described above, the microphone 222 may capture noise in an ambient environment and output a noise signal, and may also capture a voice of a target user and output a target voice signal. When the target user does not speak, the microphone signal includes only the noise signal. When the target user speaks, the microphone signal includes the target voice signal and the noise signal. The kth frame of microphone signal $x_k$ may be represented by the following formula:

$$x_k = Ps_k + d_k \qquad \text{formula (3)}$$

where k=1, 2, K; $d_k$ is a noise signal in the kth frame of microphone signal $x_k$; $s_k$ is an amplitude of the target voice signal; and P is a target steering vector of the target voice signal.

The microphone signal X may be represented by the following formula:

$$X = [x_1, x_2, \ldots, x_K] = PS + D \qquad \text{formula (4)}$$

where S is the amplitude of the target voice signal; $S=[s_1, s_2, \ldots, s_K]$; D is the noise signal; and $D=[d_1, d_2, \ldots, d_K]$.

The noise signal $d_k$ may be represented by the following formula:

$$d_k = [d_{1,k}, d_{2,k}, \ldots, d_{M,k}]^T \quad \text{formula (5)}$$

The noise signal $d_k$ in the kth frame of microphone signal $x_k$ may be an M-dimensional signal vector formed by M microphone signals.

In some exemplary embodiments, the noise signal $d_k$ may include at least a colored noise signal $c_k$. In some exemplary embodiments, the noise signal $d_k$ may further include at least a white noise signal $n_k$. The noise signal $d_k$ may be represented by the following formula:

$$d_k = c_k + n_k \quad \text{formula (6)}$$

In this case, the noise signal D=C+N. C is the colored noise signal, and $C=[c_1, c_2, \ldots, c_K]$. N is the white noise signal, and $N=[n_1, n_2, \ldots, n_K]$.

The computing apparatus 240 may use a unified mapping relationship between a cluster feature of a sound source spatial distribution of the noise signal $d_k$ and a parameter of the microphone array 220 to establish a parameterized cluster model, and perform clustering on a sound source of the noise signal $d_k$ to divide the noise signal $d_k$ into the colored noise signal $c_k$ and the white noise signal $n_k$.

In some exemplary embodiments, the noise signal D conforms to a Gaussian distribution. The noise signal $d_k$~CN (0, M). M is a noise covariance matrix of the noise signal $d_k$. The colored noise signal $c_k$ conforms to a zero-mean Gaussian distribution, that is, $c_k$~CN(0, $M_c$). The noise covariance matrix $M_c$ corresponding to the colored noise signal $c_k$ has a low-rank feature and is a low-rank semi-positive definite matrix. The white noise signal $n_k$ also conforms to a zero-mean Gaussian distribution, that is, $n_k$~CN(0, M e). Power of the white noise signal $n_k$ is $$\delta_0^2.$$

$$M_n = \delta_0^2 I_n,$$

that is, $$n_k \sim CN(0, \delta_0^2).$$

The noise covariance matrix M of the noise signal $d_k$ may be represented by the following formula:

$$M = M_c + M_n = M_c + \delta_0^2 I_n \quad \text{formula (7)}$$

The noise covariance matrix M of the noise signal $d_k$ may be decomposed into a sum of an identity matrix $I_n$ and the low-rank semi-positive definite matrix $M_c$.

In some exemplary embodiments, the power $$\delta_0^2$$

of the white noise signal $n_k$ may be prestored in the computing apparatus 240. In some exemplary embodiments, the power $$\delta_0^2$$

of the white noise signal $n_k$ may be estimated in advance by the computing apparatus 240. For example, the computing apparatus 240 may estimate the power $$\delta_0^2$$

of the white noise signal $n_k$ based on minimum tracking, a histogram, or the like. In some exemplary embodiments, the computing apparatus 240 may estimate the power $$\delta_0^2$$

of the white noise signal $n_k$ based on the method P100.

$s_k$ is a complex amplitude of the target voice signal. In some exemplary embodiments, a target voice signal source is present around the microphone 222. In some exemplary embodiments, there are L target voice signal sources around the microphone 222. In this case, $s_k$ may be an L×1-dimensional vector.

The target steering vector P is an M×L-dimensional matrix. The target steering vector P may be represented by the following formula:

$$P = \begin{bmatrix} 1 & \ldots & 1 \\ e^{-j2\pi f_0 \frac{d\cos\theta_1}{c}} & \ldots & e^{-j2\pi f_0 \frac{d\cos\theta_L}{c}} \\ \vdots & \ddots & \vdots \\ e^{-j2\pi f_0 (M-1)\frac{d\cos\theta_1}{c}} & \ldots & e^{-j2\pi f_0 (M-1)\frac{d\cos\theta_L}{c}} \end{bmatrix} \quad \text{formula (8)}$$

where $f_0$ is a carrier frequency; d is a spacing between adjacent microphones 222; c is a speed of sound; and $\theta_1, \ldots, \theta_N$ are incident angles between L target voice signal sources and microphones 222 respectively. In some exemplary embodiments, angles of the target voice signal source $s_k$ are generally distributed in a group of specific angle ranges. Therefore, $\theta_1, \ldots, \theta_N$ are known. Relative position relationships, such as relative distances, or relative coordinates, of the M microphones 222 are prestored in the computing apparatus 240. In other words, the spacing d between adjacent microphones 222 is prestored in the computing apparatus 240.

Figure 4:
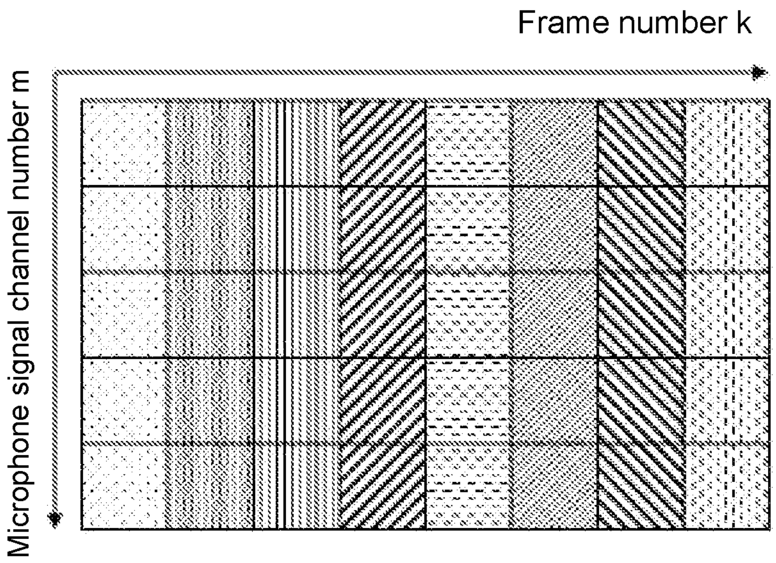
FIG. 4 is a schematic diagram of a complete observation signal according to some exemplary embodiments of this disclosure.

FIG. 4 is a schematic diagram of a complete observation signal according to some exemplary embodiments of this disclosure. In some exemplary embodiments, the microphone signal X is a complete observation signal, as shown in FIG. 4. All data in the M×K data matrix in the complete observation signal is complete. As shown in FIG. 4, a horizontal direction is a frame number k of the microphone signal X and a vertical direction is a microphone signal number m in the microphone array 220. The mth row represents the microphone signal received by the mth microphone 222, and the kth column represents the kth frame of microphone signal.

Figure 5A:
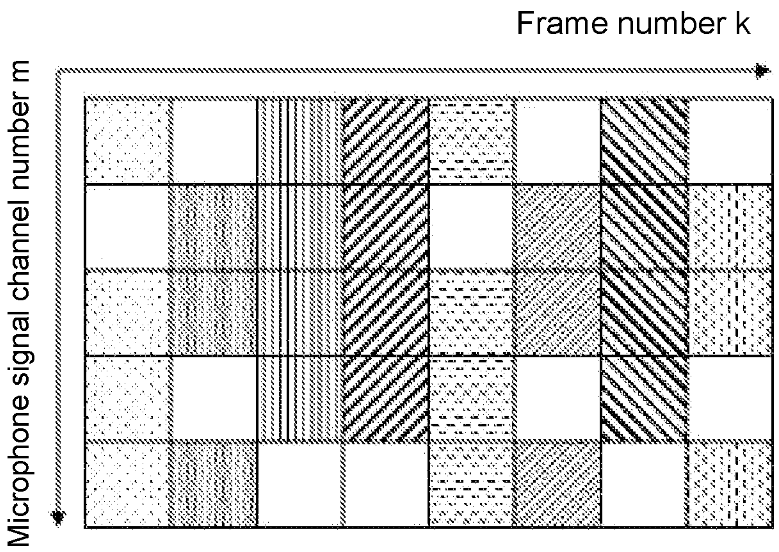
FIG. 5A is a schematic diagram of an incomplete observation signal according to some exemplary embodiments of this disclosure.

FIG. 5A is a schematic diagram of an incomplete observation signal according to some exemplary embodiments of this disclosure. In some exemplary embodiments, the microphone signal X is an incomplete observation signal, as shown in FIG. 5A. Some data in the M×K data matrix is missing in the incomplete observation signal. The computing apparatus 240 may rearrange the incomplete observation signal. As shown in FIG. 5A, a horizontal direction is a frame number k of the microphone signal X and a vertical direction is a microphone signal channel number m. The mth row represents the microphone signal received by the mth microphone 222, and the kth column represents the kth frame of microphone signal.

Figure 5B:
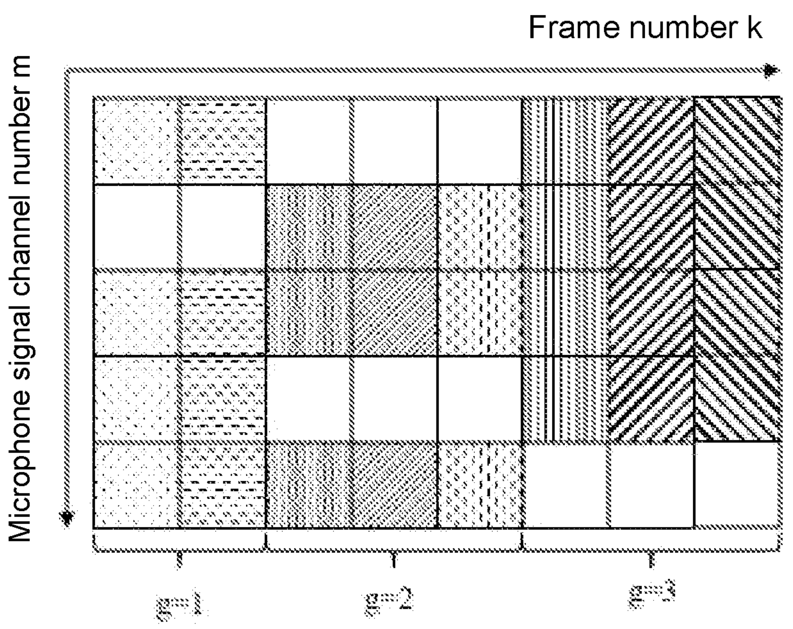
FIG. 5B is a schematic diagram of an incomplete observation signal rearrangement according to some exemplary embodiments of this disclosure.
Figure 5C:
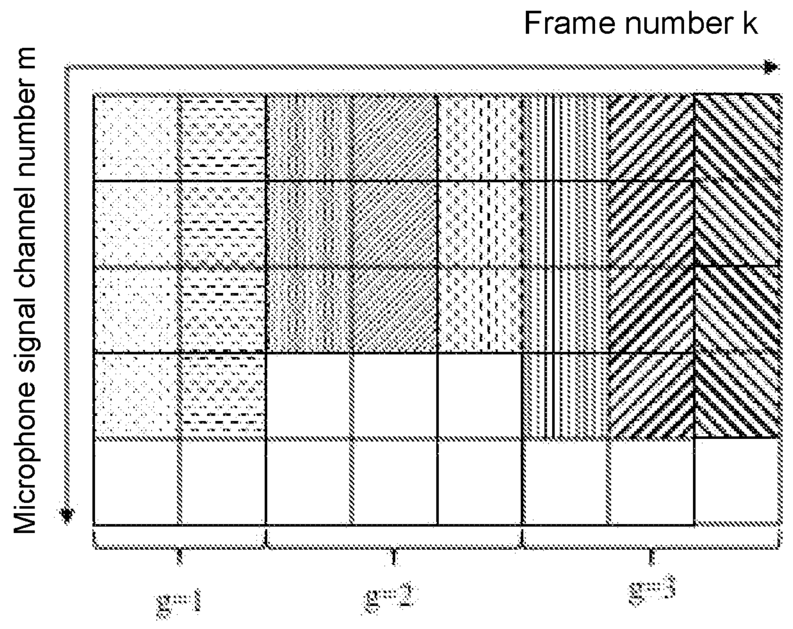
FIG. 5C is a schematic diagram of an incomplete observation signal rearrangement according to some exemplary embodiments of this disclosure.

When the microphone signal X is the incomplete observation signal, step S120 may further include rearranging the incomplete observation signal. FIG. 5B is a schematic diagram of an incomplete observation signal rearrangement according to some exemplary embodiments of this disclosure. FIG. 5C is a schematic diagram of an incomplete observation signal rearrangement according to some exemplary embodiments of this disclosure. That the computing apparatus 240 rearranges the incomplete observation signal may include: the computing apparatus 240 obtaining the incomplete observation signal; and the computing apparatus 240 performing row-column permutation on the microphone signal X based on a position of missing data in each column in the M×K data matrix, and dividing the microphone signal X into at least one sub microphone signal, where the microphone signal X includes the at least one sub microphone signal.

In the incomplete observation signal, because positions of missing data in the microphone signals $x_k$ with different frame numbers may be the same, to reduce a calculation amount and calculation time of the algorithm, the computing apparatus 240 may classify K frames of microphone signals X based on the positions of missing data in the microphone signals $x_k$ with different frame numbers, classify microphone signals $x_k$ with same positions of missing data into a same sub microphone signal, and perform permutation on row positions in the data matrix of the microphone signal X, so that positions of the microphone signals in the same sub microphone signal are adjacent, as shown in FIG. 5B. The K frames of microphone signal X are classified into at least one sub microphone signal. For ease of description, the quantity of at least one sub microphone signal is defined as G, where G is a positive integer not less than 1. A gth sub microphone signal is defined as $X_g$, where g=1, 2, . . . , G.

The calculation apparatus 240 may further perform row permutation on the microphone signal X based on the position of the missing data in each sub microphone signal $X_g$, so that positions of missing data in all sub microphone signals are adjacent, as shown in FIG. 5C.

In summary, in the incomplete observation signal, the sub microphone signal $X_g$ may be represented by the following formula:

$$X_g = P_g S_g + D_g \quad \text{formula (9)}$$

where $$X_g = Q_g X B_g^T,\ D_g = Q_g D B_g^T,\ P_g = Q_g P,\ S_g = B_g S.$$

Matrices $Q_g$ and $B_g$ are matrices formed by elements 0 and 1 and determined by the position of the missing data.

The microphone signal X may be represented by the following formula:

$$X = [X_1, X_2, \ldots, X_G] \quad \text{formula (10)}$$

For ease of description, in the following description, the microphone signal X is described as an incomplete observation signal.

As described above, the microphone 222 may capture both the noise signal D and the target voice signal. When the target voice signal is absent in the microphone signal X, the microphone signal X satisfies a first model corresponding to the noise signal D. When the target voice signal is present in the microphone signal X, the microphone signal satisfies a second model corresponding to the target voice signal mixed with the noise signal D.

For ease of description, the first model is defined by the following formula:

$$X = D \quad \text{formula (11)}$$

When the microphone signal X is a complete observation signal, the first model may be represented by the following formula:

$$x_k = d_k \quad \text{formula (12)}$$

When the microphone signal X is an incomplete observation signal, the first model may be represented by the following formula:

$$X_g = D_g \quad \text{formula (13)}$$

The second model is defined as the following formula:

$$X = PS + D \quad \text{formula (14)}$$

When the microphone signal X is a complete observation signal, the second model may be represented by the following formula:

$$x_k = P s_k + d_k \quad \text{formula (15)}$$

When the microphone signal X is an incomplete observation signal, the second model may be represented by the following formula:

$$X_g = P_g S_g + D_g \quad \text{formula (16)}$$

For ease of presentation, in the following description, an example in which the microphone signal X is an incomplete observation signal is used for description.

As shown in FIG. 3, the method P100 may further include:

S140. Optimize the first model and the second model respectively by using maximization of a likelihood function and rank minimization of a noise covariance matrix as joint optimization objectives, and determine a first estimate $\hat{M}_1$ of a noise covariance matrix $M_1$ of the first model and a second estimate $\hat{M}_2$ of a noise covariance matrix $M_2$ of the second model.

A noise covariance matrix M of an unknown parametric noise signal D is present in the first model. For ease of description, the noise covariance matrix M of the unknown parametric noise signal D in the first model is defined as $M_1$. The noise covariance matrix M of the unknown parametric noise signal D and the amplitude S of the target voice signal are present in the second model. For ease of description, the noise covariance matrix M of the unknown parametric noise signal D in the second model is defined as $M_2$. The computing apparatus 240 may optimize the first model and the second model respectively based on an optimization method, determine the first estimate $\hat{M}_1$ of the unknown parameter $M_1$, the second estimate $\hat{M}_2$ of $M_2$, and an estimate S of the amplitude S of the target voice signal.

On the one hand, the computing apparatus 240 may be triggered from a perspective of the likelihood function to optimize the design of the first model and the second model respectively by using maximization of the likelihood function as an optimization objective. On the other hand, as described above, because the noise covariance matrix $M_c$ corresponding to the colored noise signal $c_k$ has a low-rank feature and is a low-rank semi-positive definite matrix, the noise covariance matrix M of the noise signal $d_k$ may also have a low-rank feature. Especially for the incomplete observation signal, the low-rank feature of the noise covariance matrix M of the noise signal $d_k$ needs to be maintained in the process of rearranging the incomplete observation signal. Therefore, the computing apparatus 240 may optimize the design of the first model and the second model respectively based on the low-rank feature of the noise covariance matrix M of the noise signal $d_k$ by using rank minimization of the noise covariance matrix M as an optimization objective. Therefore, the computing apparatus 240 may optimize the first model and the second model respectively by using maximization of the likelihood function and rank minimization of the noise covariance matrix as joint optimization objectives, to determine the first estimate $\widehat{M_1}$ of the unknown parameter $M_1$, the second estimate $\widehat{M_2}$ of $M_2$, and the estimate S of the amplitude S of the target voice signal.

Figure 6:
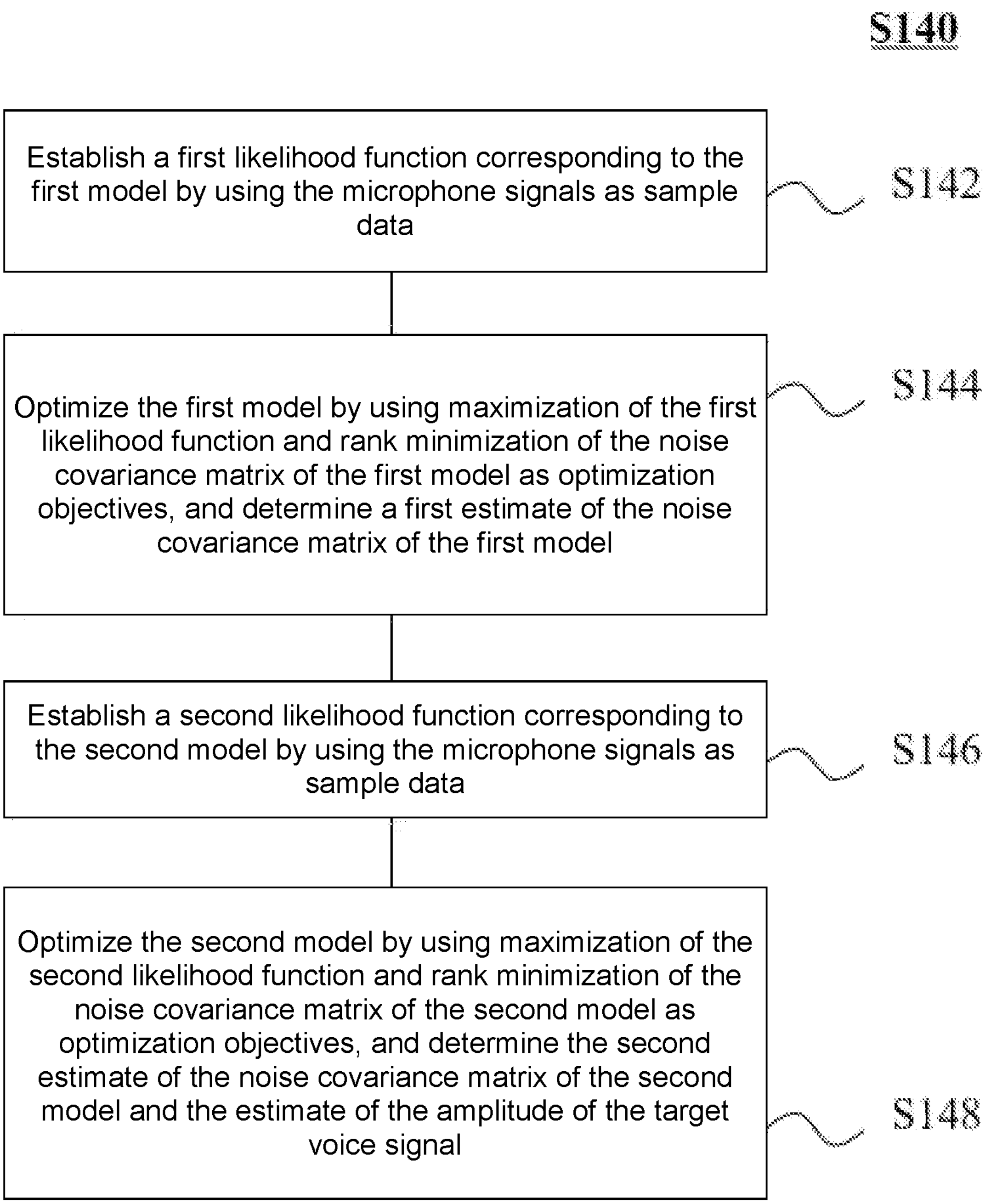
FIG. 6 is a flowchart of iterative optimization according to some exemplary embodiments of this disclosure.

FIG. 6 is a flowchart of iterative optimization according to some exemplary embodiments of this disclosure. FIG. 6 shows step S140. As shown in FIG. 6, step S140 may include:

S142. Establish a first likelihood function $L_1(M_1)$ corresponding to the first model by using the microphone signal X as sample data.

The likelihood function includes the first likelihood function $L_1(M_1)$. Based on the formulas (11) to (13), the first likelihood function $L_1(M_1)$ may be represented by the following formula:

$$\begin{cases} L_1(M_1) = f_1(x_1, x_2, \ldots, x_K \mid \widehat{M_1}) \\ L_1(M_1) = f_1(X_1, X_2, \ldots, X_G \mid \widehat{M_1}) \end{cases} \quad \text{formula (17)}$$

The formula (17) represents the first likelihood function $L_1(M_1)$ for the complete observation signal and the incomplete observation signal respectively. $\widehat{M_1}$ represents a maximum likelihood estimate of the parameter $M_1$. $f_1(x_1, x_2, \ldots, x_K \mid \widehat{M_1})$ and $f_1(X_1, X_2, \ldots, X_G \mid \widehat{M_1})$ represent a probability of occurrence of the microphone signal X after the parameter $\widehat{M_1}$ is given in the first model.

S144. Optimize the first model by using maximization of the first likelihood function $L_1(M_1)$ and rank $\mathrm{Rank}(M_1)$ minimization of the noise covariance matrix $M_1$ of the first model as optimization objectives, and determine the first estimate $\widehat{M_1}$ of $M_1$.

The maximization of the first likelihood function $L_1(M_1)$ may be represented by $\min(-\log(L_1(M_1)))$. The rank $\mathrm{Rank}(M_1)$ minimization of the noise covariance matrix $M_1$ of the first model may be represented by $\min(\mathrm{Rank}(M_1))$. As described above, the known noise covariance matrix $$\delta_0^2 I_n$$

of the white noise signal $n_k$ is used as an example for description. It can be learned from the formula (7) that the rank $\mathrm{Rank}(M_1)$ minimization of the noise covariance matrix $M_1$ of the first model may be represented by minimization $\min(\mathrm{Rank}(M_c))$ of the noise covariance matrix $M_c$ of the colored noise signal C. Therefore, an objective function of the optimization objective may be represented by the following formula:

$$\min(-\log(L_1(M_1)) + \gamma \mathrm{Rank}(M_c)) \quad \text{formula (18)}$$

where $\gamma$ is a regularization coefficient. Because minimization of the matrix rank may be relaxed to a nuclear norm minimization, the formula (18) may be represented by the following formula:

$$\min(-\log(L_1(M_1)) + \gamma \|M_c\|_*) \quad \text{formula (19)}$$

An iteration constraint of the first model may be represented by the following formula:

$$\text{s.t.} \begin{array}{l} M_c \geq 0 \\ M_1 = M_c + M_n \end{array} \quad \text{formula (20)}$$

where $M_c \geq 0$ is a positive definite constraint of the noise covariance matrix $M_c$ of the colored noise signal C. The optimization problem of the first model may be represented by the following formula:

$$\min(-\log(L_1(M_1))+\gamma\|M_c\|_*) \quad \text{s.t.} \quad \begin{matrix} M_c \geq 0 \\ M_1 = M_c + M_n \end{matrix} \qquad \text{formula (21)}$$

After determining the objective function and the constraint, the computing apparatus 240 may iteratively optimize the unknown parameter $M_1$ of the first model by using the objective function as an optimization objective to determine the first estimate $\widehat{M_1}$ of the noise covariance matrix $M_1$ of the first model.

The formula (21) is a semi-positive definite programming problem that can be solved by the computing apparatus 240 by using a variety of algorithms. For example, a gradient projection algorithm may be used. Specifically, in each iteration in the gradient projection algorithm, the formula (19) is first solved by using a gradient method without any constraint, and then a resulting solution is projected onto a semi-positive definite cone, so that the cone satisfies the matrix semi-positive definite constraint formula (20).

As shown in FIG. 6, step S140 may further include:

S146. Establish a second likelihood function $L_2(S, M_2)$ corresponding to the second model by using the microphone signal X as sample data.

The likelihood function includes the second likelihood function $L_2(S, M_2)$. Based on the formulas (14) to (16), the second likelihood function $L_2(S, M_2)$ may be represented by the following formula:

$$\begin{cases} L_2(S, M_2) = f_2(x_1, x_2, \ldots, x_K \mid \hat{S}, \hat{M_2}) \\ L_2(S, M_2) = f_2(X_1, X_2, \ldots, X_G \mid \hat{S}, \hat{M_2}) \end{cases} \qquad \text{formula (22)}$$

where the formula (22) represents the second likelihood function for the complete observation signal and the incomplete observation signal respectively. $\hat{S}$ and $\widehat{M_2}$ represent maximum likelihood estimates of parameters S and $M_2$. $f_2(x_1, x_2, \ldots, x_K|\widehat{M_2})$ and $f_2(X_1, X_2, \ldots, X_G|\hat{S}, \widehat{M_2})$ represent probabilities of occurrence of the microphone signal X after the parameters S and $M_2$ are given.

S148. Optimize the second model by using maximization of the second likelihood function $L_2(S, M_2)$ and rank Rank $(M_2)$ minimization of the noise covariance matrix $M_2$ of the second model as optimization objectives, and determine the second estimate $\widehat{M_2}$ and the estimate S of the amplitude S of the target voice signal.

The maximization of the second likelihood function $L_2(S, M_2)$ may be represented by $\min(-\log(L_2(S, M_2)))$. The rank $\text{Rank}(M_2)$ minimization of the noise covariance matrix $M_2$ of the second model may be represented by $\min(\text{Rank}(M_2))$. As described above, the known noise covariance matrix $$\delta_0^2 I_n$$

of the white noise signal $n_k$ is used as an example for description. It can be learned from the formula (7) that the rank $\text{Rank}(M_2)$ minimization of the noise covariance matrix $M_2$ of the second model may be represented by minimization $\min(\text{Rank}(M_c))$ of the noise covariance matrix $M_c$ of the colored noise signal C. Therefore, an objective function of the optimization objective may be represented by the following formula:

$$\min(-\log(L_2(S, M_2))+\gamma\text{Rank}(M_c)) \qquad \text{formula (23)}$$

where $\gamma$ is a regularization coefficient. Because minimization of the matrix rank may be relaxed to a nuclear norm minimization problem, the formula (23) may be represented by the following formula:

$$\min(-\log(L_2(S, M_2))+\gamma\|M_c\|_*) \qquad \text{formula (24)}$$

An iteration constraint of the second model may be represented by the following formula:

$$\text{s.t.} \quad \begin{matrix} M_c \geq 0 \\ M_2 = M_c + M_n \end{matrix} \qquad \text{formula (25)}$$

where $M_c \geq 0$ is a positive definite constraint of the noise covariance matrix $M_c$ of the colored noise signal C. The optimization problem of the second model may be represented by the following formula:

$$\min(-\log(L_2(S, M_2))+\gamma\|M_c\|_*) \quad \text{s.t.} \quad \begin{matrix} M_c \geq 0 \\ M_2 = M_c + M_n \end{matrix} \qquad \text{formula (26)}$$

After determining the objective function and the constraint, the computing apparatus 240 may iteratively optimize the unknown parameter $M_2$ of the second model by using the objective function as an optimization objective to determine the second estimate $\widehat{M_2}$ the noise covariance matrix $M_2$ of the second model and the estimate S of the amplitude S of the target voice signal.

The formula (26) is a semi-positive definite programming problem that can be solved by the computing apparatus 240 by using a variety of algorithms. For example, a gradient projection algorithm may be used. Specifically, in each iteration of the gradient projection algorithm, the formula (24) is first solved by using the gradient method without any constraint, and then a resulting solution is projected onto a semi-positive definite cone, so that the cone satisfies the matrix semi-positive definite constraint formula (25).

In summary, the method P100 may optimize the first model and the second model respectively by using maximization of the likelihood function and rank minimization of the noise covariance matrix as joint optimization objectives, to determine the first estimate $\widehat{M_1}$ of the unknown parameter $M_1$ and the second estimate $\widehat{M_2}$ of $M_2$, so that estimation accuracy of $M_1$ and $M_2$ are higher, to provide a higher-accuracy data model for subsequent statistical hypothesis testing, thereby improving accuracy of voice activity detection and a voice enhancement effect.

As shown in FIG. 3, the method P100 may further include:

S160. Determine, based on statistical hypothesis testing, a target model and a noise covariance matrix M corresponding to the microphone signal X.

The target model includes one of the first model and the second model. The noise covariance matrix M of the microphone signal X is the noise covariance matrix of the target model. When the target model of the microphone signal X is the first model, the noise covariance matrix M of the microphone signal X is equal to $\widehat{M_1}$ When the target model of the microphone signal X is the second model, the noise covariance matrix M of the microphone signal X is equal to $\widehat{M_2}$.

The computing apparatus 240 may determine, based on the statistical hypothesis testing method, whether the microphone signal X satisfies the first model or the second model, and therefore determine whether the target voice signal is present in the microphone signal X.

Figure 7:
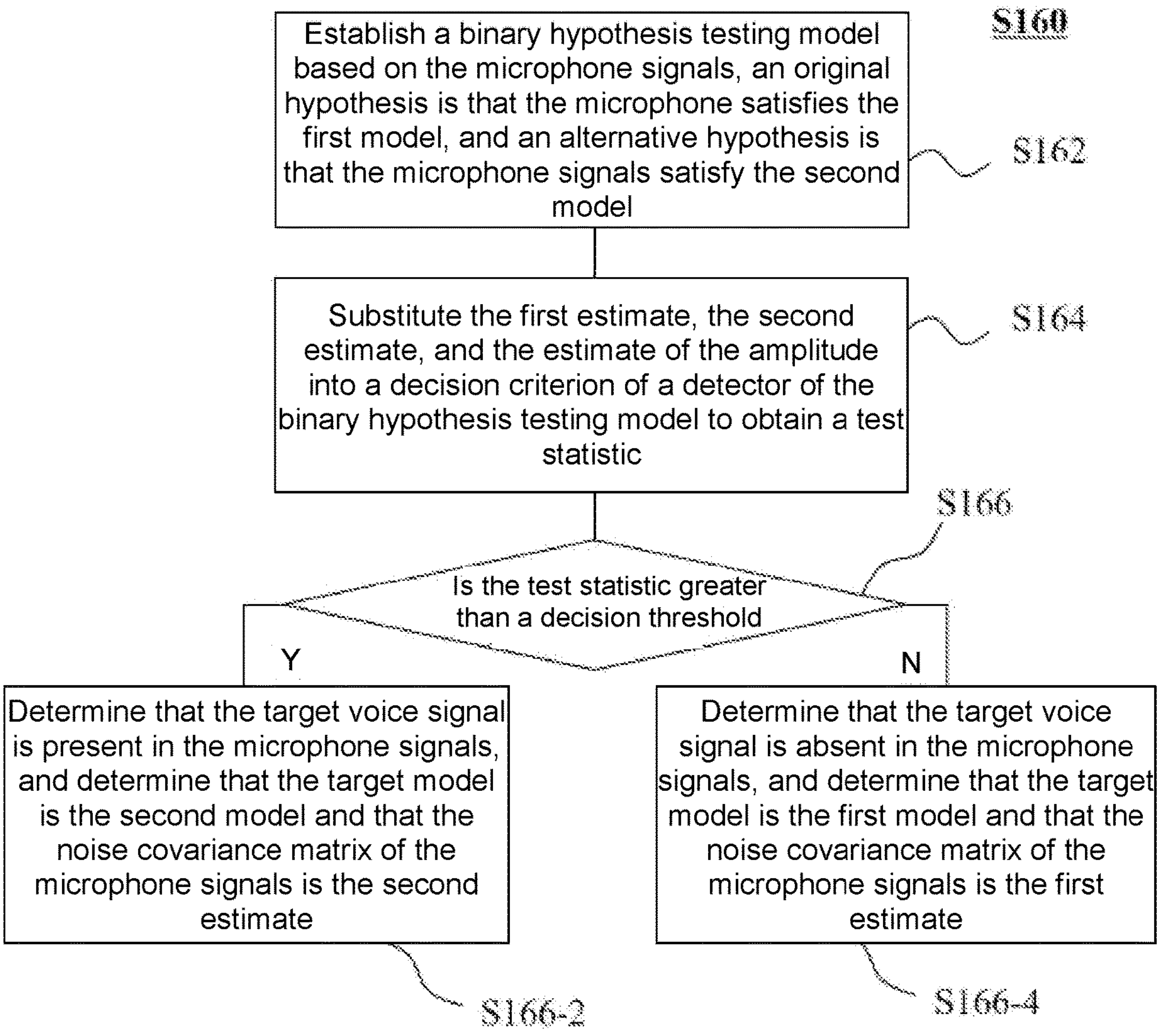
FIG. 7 is a flowchart for determining a target model according to some exemplary embodiments of this disclosure.

FIG. 7 is a flowchart for determining the target model according to some exemplary embodiments of this disclosure. The flowchart shown in FIG. 7 is step S160. As shown in FIG. 7, step S160 may include:

S162. Establish a binary hypothesis testing model based on the microphone signal X.

An original hypothesis $H_0$ of the binary hypothesis testing model may be that the target voice signal is absent in the microphone signal X, that is, the microphone signal X satisfies the first model. An alternative hypothesis $H_1$ of the binary hypothesis testing model may be that the target voice signal is present in the microphone signal X, that is, the microphone signal satisfies the second model. The binary hypothesis testing model may be represented by the following formula:

$$\begin{cases} H_0: x_k = d_k & k = 1, 2, \ldots, K \\ H_1: x_k = Ps_k + d_k & k = 1, 2, \ldots, K \end{cases} \quad \text{formula (27)}$$

$$\begin{cases} H_0: X_g = D_g & g = 1, 2, \ldots, G \\ H_1: X_g = P_gS_g + D_g & g = 1, 2, \ldots, G \end{cases} \quad \text{formula (28)}$$

where the microphone signal X in the formula (27) is a complete observation signal; and the microphone signal X in the formula (28) is an incomplete observation signal.

S164. Substitute the first estimate $\widehat{M_1}$, the second estimate $\widehat{M_2}$, and the estimate Ŝ of the amplitude S into a decision criterion of a detector of the binary hypothesis testing model to obtain a test statistic ψ.

The detector may be any one or more detectors. In some exemplary embodiments, the detector may be one or more of a GLRT detector, a Rao detector, and a Wald detector. In some exemplary embodiments, the detector may alternatively be a u-detector, a t-detector, a $\chi^2$ detector (a chi-square detector), an F-detector, a rank-sum detector, and the like. Different detectors have different test statistics tp.

The GLRT detector (Generalized Likelihood Ratio Test, generalized likelihood ratio test detector) is used as an example for description. When the microphone signal X is a complete observation signal, in the GLRT detector, the test statistic m be represented b the following formula:

$$\Psi = \frac{f_{H_1}(x_1, x_2, \ldots, x_K \mid \widehat{s_{H_1}}, \widehat{M_{H_1}})}{f_{H_0}(x_1, x_2, \ldots, x_K \mid \widehat{M_{H_0}})} \quad \text{formula (29)}$$

where $f_{H_0}$ $(x_1, x_2, \ldots, x_K|\widehat{M_{H_0}})$ and $f_{H_1}$ $(x_1, x_2, \ldots, x_K|\widehat{S_{H_1}}, \widehat{M_{H_1}})$ are respectively likelihood functions under the original hypothesis $H_0$ and the alterative hypothesis $H_1$; $f_{H_1}$ $(x_1, x_2, \ldots, x_K|\widehat{S_{H_1}}, \widehat{M_{H_1}}) = f_2(x_1, x_2, \ldots, x_K|\widehat{M_2})$; and $f_{H_0}(x_1, x_2, \ldots, x_K|\widehat{M_{H_0}}) = f_1(x_1, x_2, \ldots, x_K|\widehat{M_1})$.

When the microphone signal X is an incomplete observation signal, in the GLRT detector, the test statistic ψ may be represented by the following formula:

$$\psi = \frac{f_{H_1}(X_1, X_2, \ldots, X_G \mid \widehat{S_{H_1}}, \widehat{M_{H_1}})}{f_{H_0}(X_1, X_2, \ldots, X_G \mid \widehat{M_{H_0}})} \quad \text{formula (30)}$$

where $f_{H_0}(X_1, X_2, \ldots, X_G|\widehat{M_{H_0}})$ and $f_{H_1}(X_1, X_2, \ldots, X_G|\widehat{S_{H_1}}, \widehat{M_{H_1}})$ are respectively likelihood functions under the origin hypothesis $H_0$ and the alternative hypothesis $H_1$; $f_{H_1}(X_1, X_2, \ldots, X_G|\widehat{S_{H_1}}, \widehat{M_{H_1}}) = f_2(X_1, X_2, \ldots, X_G|, \hat{S}, \widehat{M_2}$ and $f_{H_0}(X_1, X_2, \ldots, X_G|\widehat{M_{H_0}}) = f_1(X_1, X_2, \ldots, X_G|\widehat{M_1})$.

In the GLRT detector, unknown parameters $\widehat{M_{H_0}}$, $\widehat{S_{H_1}}$, and $\widehat{M_{H_1}}$ under the original hypothesis $H_0$ and the alternative hypothesis $H_1$ all need to be estimated, so there are many parameters to be estimated. The Rao detector only needs to $\widehat{M_{H_0}}$ estimate the unknown parameter $\widehat{M_{H_0}}$ under the original hypothesis $H_0$. When the quantity of frames is K, the Rao detector has the same detection performance as the GLRT detector. However, when the quantity K of frames is limited, the Rao detector cannot achieve the same detection performance as the GLRT detector, but the Rao detector has advantages of simpler calculation and being more suitable for cases in which it is difficult to solve unknown parameters under the alternative hypothesis $H_1$.

Therefore, in view of requirements of an actual system for balancing detection performance and calculation complexity, the Rao detector is proposed for the computing apparatus 240 on a basis of the foregoing GLRT detector. Using the incomplete observation signal as an example, the test statistic ψ of the Rao detector may be represented by the following formula:

$$\psi = \frac{\partial \log f(X_1, X_2, \ldots, X_G \mid \theta, M)}{\partial \theta_r}^T\Bigg|_{\theta=\widehat{\theta_0}} \left[J^{-1}(\widehat{\theta_0})\right]_{\theta_r,\theta_r} \frac{\partial \log f(X_1, X_2, \ldots, X_G \mid \theta, M)}{\partial \theta_r}\Bigg|_{\theta=\widehat{\theta_0}} \quad \text{formula (31)}$$

where $f(X_1, X_2, \ldots, X_G|\theta, M)$ represents a probability density function under the alternative hypothesis $H_1$; $M=M_2$;

$\theta_r = [PS_{R,1}, PS_{R,2}, \ldots, PS_{R,M}, PS_{L,1}, PS_{L,2}, \ldots, PS_{L,M}]^T$, where $PS_{R,m}$ is a real part of an amplitude of a target voice signal in an audio signal of the mth microphone 222, $PS_{L,m}$ is an imaginary part of the amplitude of the target voice signal in the audio signal of the mth microphone 222, and $m=1,2, \ldots, M$; $\theta_r$ is a 2M-dimensional vector; and $$\theta = [\theta_r^T\ \theta_s^T]^T,$$

where $\theta_s$ is a real vector containing redundant parameters, including real and imaginary parts of M off-diagonal elements and elements on diagonals. The formula (31) may be simplified to the following formula:

$$\psi = \sum_g^G X_g^H M_g^{-1} P_g \left[P_g^H M_g^{-1} P_g\right]^{-1} P_g^H M_g^{-1} X_g \quad \text{formula (32)}$$

where $$M_g = Q_g M Q_g^T$$

In the formula (32), the test statistic $\psi$ of the Rao test may be obtained as long as the estimate $\widehat{M_1}$ of the unknown parameter $\widehat{M_{H_0}}$ under the original hypothesis $H_0$ may be obtained.

S166. Determine the target model of the microphone signal X based on the test statistic $\psi$.

Specifically, step S166 may include:

S166-2. Determine that the test statistic $\psi$ is greater than a preset decision threshold $\eta$, determine that the target voice signal is present in the microphone signal, and determine that the target model is the second model and that the noise covariance matrix of the microphone signal is the second estimate $\widehat{M_2}$; or

S166-4. Determine that the test statistic $\psi$ is less than a preset decision threshold, determine that the target voice signal is absent in the microphone signal, and determine that the target model is the first model and that the noise covariance matrix of the microphone signal is the first estimate $\widehat{M_1}$.

Step S166 may be represented by the following formula:

$$\psi \underset{H_0}{\overset{H_1}{\gtrless}} \eta \quad \text{formula (33)}$$

The decision threshold n is a parameter related to a false alarm probability. The false alarm probability may be obtained by experiment, machine learning, or experience.

As shown in FIG. 3, the method P100 may further include:

S180. Output a target pattern of the microphone signal X and the noise covariance matrix M.

The computing apparatus 240 may output the target pattern of the microphone signal X and the noise covariance matrix M to other calculation modules, such as a voice enhancement module.

In summary, in the voice activity detection system and method P100 provided in this disclosure, the computing apparatus 240 may optimize the first model and the second model respectively by using maximization of the likelihood function and rank minimization of the noise covariance matrix as joint optimization objectives, to determine the first estimate $\widehat{M_1}$ of the known parameter $M_1$ and the second estimate $\widehat{M_2}$ of $M_2$, so that estimation accuracy of $M_1$ and $M_2$ are higher, to provide a higher-accuracy data model for subsequent statistical hypothesis testing, thereby improving accuracy of voice activity detection and the voice enhancement effect.

This disclosure further provides a voice enhancement system. The voice enhancement system may also be applied to an electronic device 200. In some exemplary embodiments, the voice enhancement system may include a computing apparatus 240. In some exemplary embodiments, the voice enhancement system may be applied to the computing apparatus 240. In other words, the voice enhancement system may operate on the computing apparatus 240. The voice enhancement system may include a hardware device having a data information processing function and a program required to drive the hardware device to work. Certainly, the voice enhancement system may also be only a hardware device having a data processing capability or only a program running in a hardware device.

The voice enhancement system may store data or an instruction for performing a voice enhancement method described in this disclosure and may execute the data and/or the instruction. When the voice enhancement system operates on the computing apparatus 240, the voice enhancement system may obtain a microphone signal(s) from a microphone array 220 based on a communication and execute the data or the instruction of the voice enhancement method described in this disclosure. The voice enhancement method is described in other parts of this disclosure. For example, the voice enhancement method is described in the description of FIG. 8.

When operating on the computing apparatus 240, the voice enhancement system is in communication with the microphone array 220. A storage medium 243 may further include at least one instruction set stored in a data storage apparatus and used for performing voice enhancement calculation on the microphone signal(s). The instruction may be computer program code. The computer program code may include a program, a routine, an object, a component, a data structure, a process, a module, or the like for performing the voice enhancement method provided in this disclosure. A processor 242 may read the at least one instruction set and perform, based on the at least one instruction set, the voice enhancement method provided in this disclosure. The processor 242 may perform all steps included in the voice enhancement method.

Figure 8:
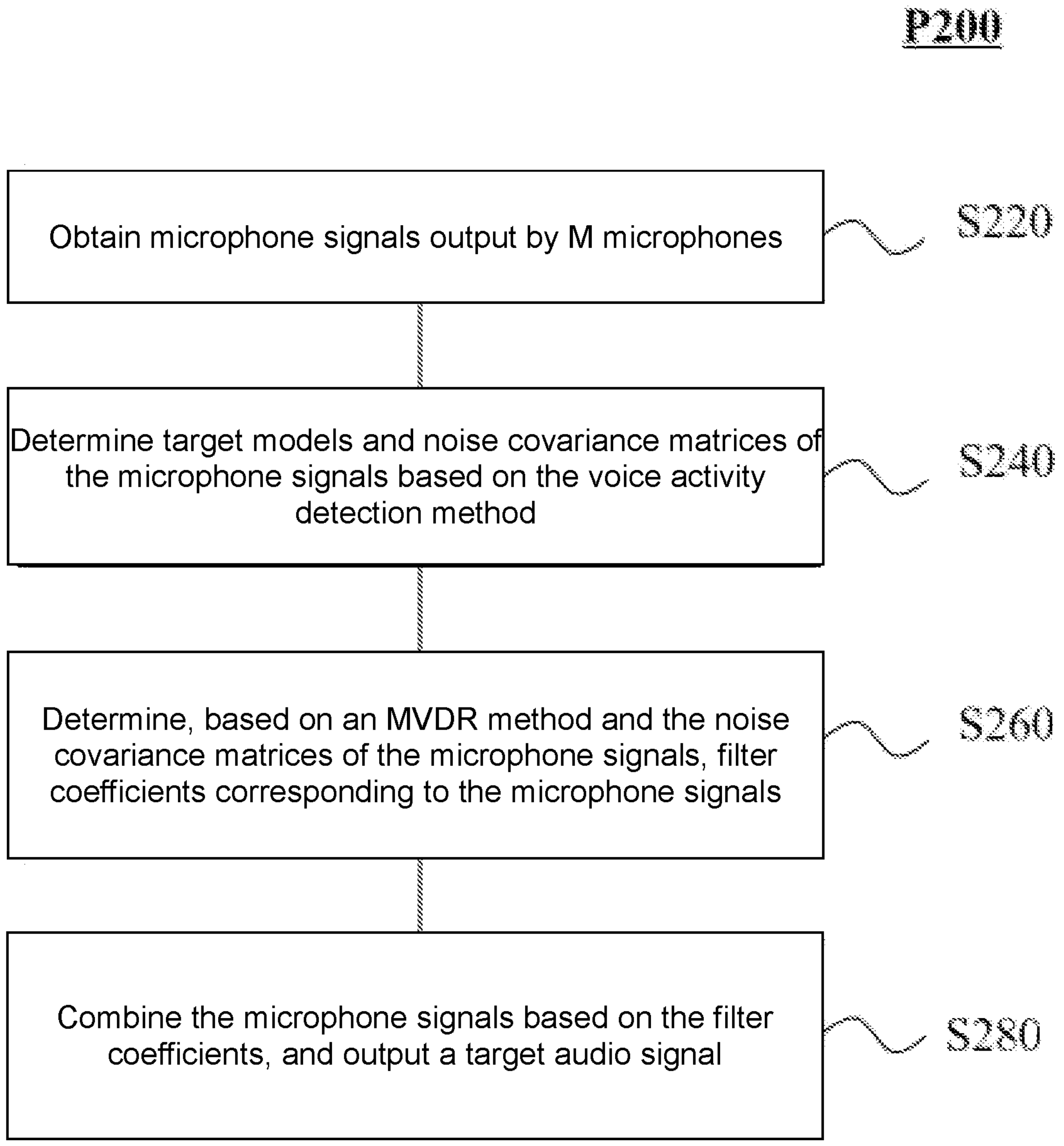
FIG. 8 is a flowchart of a voice enhancement method according to some exemplary embodiments of this disclosure.

FIG. 8 is a flowchart of a voice enhancement method P200 according to some exemplary embodiments of this disclosure. The method P200 may perform voice enhancement on a microphone signal. Specifically, a processor 242 may perform the method P200. As shown in FIG. 8, the method P200 may include the following steps.

S220. Obtain microphone signals X output by M microphones.

This step is the same as step S120, and will not be described herein again.

S240. Determine target models of the microphone signals X and noise covariance matrices M of the microphone signals X based on the voice activity detection method P100.

The noise covariance matrix M of the microphone signal X is a noise covariance matrix of the target model. When the target model of the microphone signal X is a first model the noise covariance matrix M of the microphone signal X is equal to $\widehat{M_1}$. When the target model of the microphone signal X is a second model, the noise covariance matrix M of the microphone signal X is equal to $\widehat{M_2}$.

S260. Determine, based on an MVDR method and the noise covariance matrices M of the microphone signals X, filter coefficients W corresponding to the microphone signals.

The filter coefficient $\omega$ may be an M×1-dimensional vector. The filter coefficient $\omega$ may be represented by the following formula:

$$\omega = [\omega_1, \omega_2, \ldots, \omega_M]^H \quad \text{formula (34)}$$

where the filter coefficient corresponding to the mth microphone 222 is ωm, and m=1,2, . . . , M.

The filter coefficient ω may be represented by the following formula:

$$\omega = \frac{M^{-1}P}{P^H M^{-1}P} \quad \text{formula (35)}$$

As described above, P is a target steering vector of a target voice signal. In some exemplary embodiments, P is known.

S280. Combine the microphone signals X based on the filter coefficients, and output a target audio signal $y_k$.

The target audio signal Y may be represented by the following formula:

$$Y = \omega^H X \quad \text{formula (36)}$$

The computing apparatus 240 may output the target audio signal Y to other electronic devices, such as a remote communications device.

In summary, the voice activity detection system and method P100, and the voice enhancement system and method P200 provided in this disclosure may be applied to the microphone array 220 formed by a plurality of microphones 222. The voice activity detection system and method P100, and the voice enhancement system and method P200 may obtain the microphone signal X captured by the microphone array 220. The microphone signal X may be the first model corresponding to the noise signal or may be the second model corresponding to the target voice signal mixed with the noise signal. The voice activity detection system and method P100, and the voice enhancement system and method P200 may optimize the first model and the second model respectively by using the microphone signal X as a sample and using maximization of the likelihood function and rank minimization of the noise covariance matrix M of the microphone signal X as joint optimization objectives, and determine the first estimate $\widehat{M_1}$ of the noise covariance matrix $M_1$ of the first model and the second estimate $\widehat{M_2}$ of the noise covariance matrix $M_2$ of the second model; and determine, by using the statistical hypothesis testing method, whether the microphone signal X satisfies the first model or the second model, thereby determining whether the target voice signal is present in the microphone signal X, determine the noise covariance matrix M of the microphone signal X, and further perform voice enhancement on the microphone signal X based on the MVDR method. The voice activity detection system and method P100, and the voice enhancement system and method P200 may make estimation accuracy of the noise covariance matrix M and accuracy of voice activity detection higher, thereby improving the voice enhancement effect.

Another aspect of this disclosure provides a non-transitory storage medium. The non-transitory storage medium stores at least one set of executable instructions for voice activity detection, and when the executable instructions are executed by a processor, the executable instructions instruct the processor to implement steps of the voice activity detection method P100 described in this disclosure. In some possible implementations, each aspect of this disclosure may be further implemented in a form of a program product, where the program product includes program code. When the program product operates on a computing device (for example, the computing apparatus 240), the program code may be used to enable the computing device to perform steps of voice activity detection described in this disclosure. The program product for implementing the foregoing method may use a portable compact disc read-only memory (CD-ROM) including program code, and may run on the computing device. However, the program product in this disclosure is not limited thereto. In this disclosure, a readable storage medium may be any tangible medium containing or storing a program, and the program may be used by or in connection with an instruction execution system (for example, the processor 242). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium include: an electrical connection having one or more conducting wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. The computer-readable storage medium may include a data signal propagated in a baseband or as part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program to be used by or in combination with an instruction execution system, apparatus, or device. The program code contained in the readable storage medium may be transmitted by using any appropriate medium, including but not limited to wireless, wired, optical cable, RF, or the like, or any appropriate combination thereof. The program code for performing operations in this disclosure may be compiled in any combination of one or more programming languages. The programming languages include object-oriented programming languages such as Java and C++, and further include conventional procedural programming languages such as a "C" language or a similar programming language. The program code may be fully executed on the computing device, partially executed on the computing device, executed as an independent software package, partially executed on the computing device and partially executed on a remote computing device, or fully executed on a remote computing device.

Specific exemplary embodiments of this disclosure have been described above. Other embodiments also fall within the scope of the appended claims. In some cases, actions or steps described in the claims may be performed in an order different from orders in the embodiments and still achieve expected results. In addition, the processes depicted in the drawings do not necessarily require a specific order or sequence to achieve the expected results. In some implementations, multitask processing and parallel processing are also possible or may be advantageous.

In summary, after reading this detailed disclosure, a person skilled in the art may understand that the foregoing detailed disclosure is illustrative, rather than restrictive. A person skilled in the art may understand that this disclosure is intended to cover various reasonable changes, improvements, and modifications to the embodiments, although this is not stated herein. These changes, improvements, and modifications are intended to be made in this disclosure and are within the spirit and scope of this disclosure.

In addition, some terms in this disclosure have been used to describe the embodiments of this disclosure. For example, "one embodiment", "an embodiment", and/or "some exemplary embodiments" mean/means that a specific feature, structure, or characteristic described with reference to the embodiment(s) may be included in at least one embodiment of this disclosure. Therefore, it can be emphasized and should be understood that in various parts of this disclosure, two or more references to "an embodiment" or "one embodiment" or "an alternative embodiment" do not necessarily all refer to the same embodiment. Further, specific features, structures, or characteristics may be appropriately combined in one or more embodiments of this disclosure.

It should be understood that in the foregoing description of the embodiments of this disclosure, to help understand one feature and for the purpose of simplifying this disclosure, various features in this disclosure are combined in a single embodiment, single drawing, or description thereof. However, this does not mean that the combination of these features is necessary. It is entirely possible for a person skilled in the art to extract some of the features as a separate embodiment for understanding when reading this disclosure. In other words, an embodiment of this disclosure may also be understood as the integration of a plurality of sub-embodiments. It is also true when content of each sub-embodiment is less than all features of a single embodiment disclosed above.

Each patent, patent application, patent application publication, and other materials cited herein, such as articles, books, disclosures, publications, documents, and materials, can be incorporated herein by reference, which are applicable to all content used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistency or conflict in descriptions, definitions, and/or use of a term associated with this document and descriptions, definitions, and/or use of the term associated with any material, the term in this document shall prevail.

Finally, it should be understood that the implementation solutions of this application disclosed herein illustrate the principles of the implementation solutions of this disclosure. Other modified embodiments also fall within the scope of this disclosure. Therefore, the embodiments disclosed in this disclosure are merely exemplary and not restrictive. A person skilled in the art may use alternative configurations to implement the application in this disclosure according to the embodiments of this disclosure. Therefore, the embodiments of this disclosure are not limited to those specific embodiments specifically described in this application.

What is claimed is:

1. A voice activity detection system, comprising:

at least one storage medium storing a set of instructions for voice activity detection; and at least one processor in communication with the at least one storage medium, wherein during a process of voice activity detection for M microphones distributed in a preset array shape, wherein M is an integer greater than 1, the at least one processor executes the set of instructions to:

obtain microphone signals output by the M microphones, wherein the microphone signals satisfy a first model corresponding to absence of a target voice signal or a second model corresponding to presence of a target voice signal, optimize the first model and the second model respectively by using maximization of a likelihood function and rank minimization of a noise covariance matrix as joint optimization objectives, and determine a first estimate of a noise covariance matrix of the first model and a second estimate of a noise covariance matrix of the second model, and determine that the microphone signals satisfy a target model from the first model and the second model and a noise covariance matrix corresponding to the microphone signals, wherein the noise covariance matrix of the microphone signals is a noise covariance matrix of the target model; and applying the noise covariance matrix in an operation to process the microphone signals.

2. The voice activity detection system according to claim 1, wherein the microphone signals include K frames of continuous audio signals, K is a positive integer greater than 1, and the microphone signals include an M×K data matrix.

3. The voice activity detection system according to claim 2, wherein the microphone signals are complete observation signals or incomplete observation signals, all data in the M×K data matrix in the complete observation signals is complete, and a part of data in the M×K data matrix in the incomplete observation signals is missing, and when the microphone signals are the incomplete observation signals, to obtain the microphone signals output by the M microphones, the at least one processor executes the set of instructions to:

obtain the incomplete observation signals, and perform row-column permutation on the microphone signals based on a position of missing data in each column in the M×K data matrix, and divide the microphone signals into at least one sub microphone signal, wherein the microphone signals include the at least one sub microphone signal.

4. The voice activity detection system according to claim 1, wherein to optimize the first model and the second model respectively by using maximization of the likelihood function and rank minimization of the noise covariance matrix as the joint optimization objectives, the at least one processor executes the set of instructions to:

establish a first likelihood function corresponding to the first model by using the microphone signals as sample data, wherein the likelihood function includes the first likelihood function;

optimize the first model by using maximization of the first likelihood function and rank minimization of the noise covariance matrix of the first model as optimization objectives, and determine the first estimate;

establish a second likelihood function corresponding to the second model by using the microphone signals as sample data, wherein the likelihood function includes the second likelihood function; and optimize the second model by using maximization of the second likelihood function and rank minimization of the noise covariance matrix of the second model as optimization objectives, and determine the second estimate and an estimate of an amplitude of the target voice signal.

5. The voice activity detection system according to claim 4, wherein the microphone signals include a noise signal, the noise signal conforms to a Gaussian distribution, and the noise signal includes at least:

a colored noise signal conforming to a zero-mean Gaussian distribution, wherein a noise covariance matrix corresponding to the colored noise signal is a low-rank semi-positive definite matrix.

6. The voice activity detection system according to claim 4, wherein to determine the target model and the noise covariance matrix corresponding to the microphone signals, the at least one processor executes the set of instructions to:

establish a binary hypothesis testing model based on the microphone signals, wherein an original hypothesis of the binary hypothesis testing model includes that the microphone signals satisfy the first model, and an alternative hypothesis of the binary hypothesis testing model includes that the microphone signals satisfy the second model;

substitute the first estimate, the second estimate, and the estimate of the amplitude into a decision criterion of a detector of the binary hypothesis testing model to obtain a test statistic; and determine the target model of the microphone signals based on the test statistic.

7. The voice activity detection system according to claim 6, wherein to determine the target model of the microphone signals based on the test statistic, the at least one processor executes the set of instructions to:

determine that the test statistic is greater than a preset decision threshold, determine that the target voice signal is present in the microphone signals, and determine that the target model is the second model and that the noise covariance matrix of the microphone signals is the second estimate; or determine that the test statistic is less than the preset decision threshold, determine that the target voice signal is absent in the microphone signals, and determine that the target model is the first model and that the noise covariance matrix of the microphone signals is the first estimate.

8. The voice activity detection system according to claim 6, wherein the detector includes at least one of a generalized likelihood ratio test (GLRT) detector, a Rao detector, or a Wald detector.

9. A voice activity detection method, wherein the method is for M microphones distributed in a preset array shape, and M is an integer greater than 1, the voice activity detection method comprising:

obtaining microphone signals output by the M microphones, wherein the microphone signals satisfy a first model corresponding to absence of a target voice signal or a second model corresponding to presence of a target voice signal;

optimizing the first model and the second model respectively by using maximization of a likelihood function and rank minimization of a noise covariance matrix as joint optimization objectives, and determining a first estimate of a noise covariance matrix of the first model and a second estimate of a noise covariance matrix of the second model; and determining that the microphone signals satisfy a target model from the first model and the second model and a noise covariance matrix corresponding to the microphone signals, wherein the noise covariance matrix of the microphone signals is a noise covariance matrix of the target model; and applying the noise covariance matrix in an operation to process the microphone signals.

10. The voice activity detection method according to claim 9, wherein the determining of the target model and the noise covariance matrix corresponding to the microphone signals includes:

establishing a binary hypothesis testing model based on the microphone signals, wherein an original hypothesis of the binary hypothesis testing model includes that the microphone signals satisfy the first model, and an alternative hypothesis of the binary hypothesis testing model includes that the microphone signals satisfy the second model;

substituting the first estimate, the second estimate, and an amplitude estimate into a decision criterion of a detector of the binary hypothesis testing model to obtain a test statistic; and determining the target model of the microphone signals based on the test statistic.

* * * * *